United States Patent [19]
Shakkarwar

[11] Patent Number: 5,933,611
[45] Date of Patent: Aug. 3, 1999

[54] DYNAMIC SCHEDULER FOR TIME MULTIPLEXED SERIAL BUS

[75] Inventor: Rajesh G. Shakkarwar, Santa Clara, Calif.

[73] Assignee: Opti Inc., Milpitas, Calif.

[21] Appl. No.: 08/881,031

[22] Filed: Jun. 23, 1997

[51] Int. Cl.[6] .................................................. G06F 13/00
[52] U.S. Cl. ..................................... 395/306; 395/200.71
[58] Field of Search .............................. 395/306, 200.68, 395/200.73

[56] References Cited

U.S. PATENT DOCUMENTS

| | | | |
|---|---|---|---|
| 4,517,641 | 5/1985 | Pinheiro | 395/825 |
| 5,390,351 | 2/1995 | Di Giulio et al. | 395/725 |
| 5,699,519 | 12/1997 | Shiobara | 395/200.11 |
| 5,745,758 | 4/1998 | Shaw et al. | 395/200.72 |
| 5,774,654 | 6/1998 | Maki | 395/200.68 |

OTHER PUBLICATIONS

Compaq Computer Corp., et al., "Universal Serial Bus Specification", Rev. 1.0 (Jan. 15, 1996).

Primary Examiner—Ayaz R. Sheikh
Assistant Examiner—David A. Wiley
Attorney, Agent, or Firm—Fliesler Dubb Meyer & Lovejoy LLP

[57] ABSTRACT

Method and apparatus for improving bus utilization on a bus having a tiered topology, by estimating the worst-case transaction duration time for executing a transaction. The sum of three delays $D_{fixed}$, $D_{data}$ and $D_{hub\_depth}$, is detemined, where $D_{fixed}$ is a delay component which can depend on the transmission duration type of the transaction, as well as other fixed delays; $D_{data}$ is a delay component which depends on a number $N_{bytes}$ of bytes to be transmitted for the transaction, and $D_{hub\_depth}$ is a delay component which depends (in one aspect) on the actual maximum hub depth in the bus topology, or which depends (in another aspect) on the actual hub depth of the target device.

61 Claims, 12 Drawing Sheets

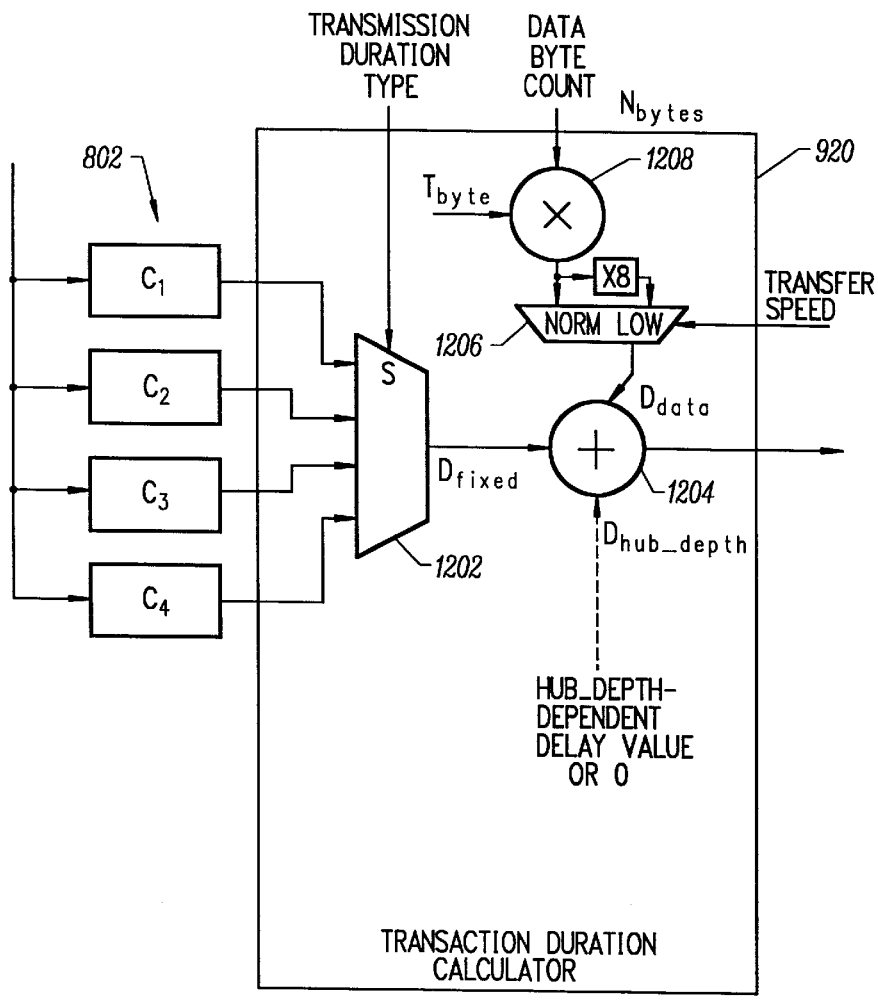
FIG. 12
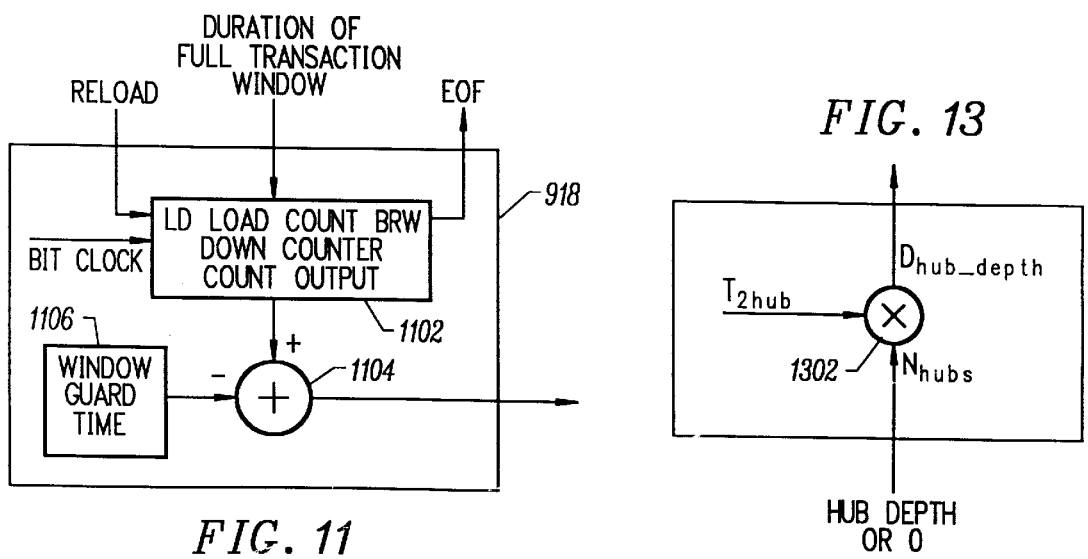
FIG. 11
FIG. 13

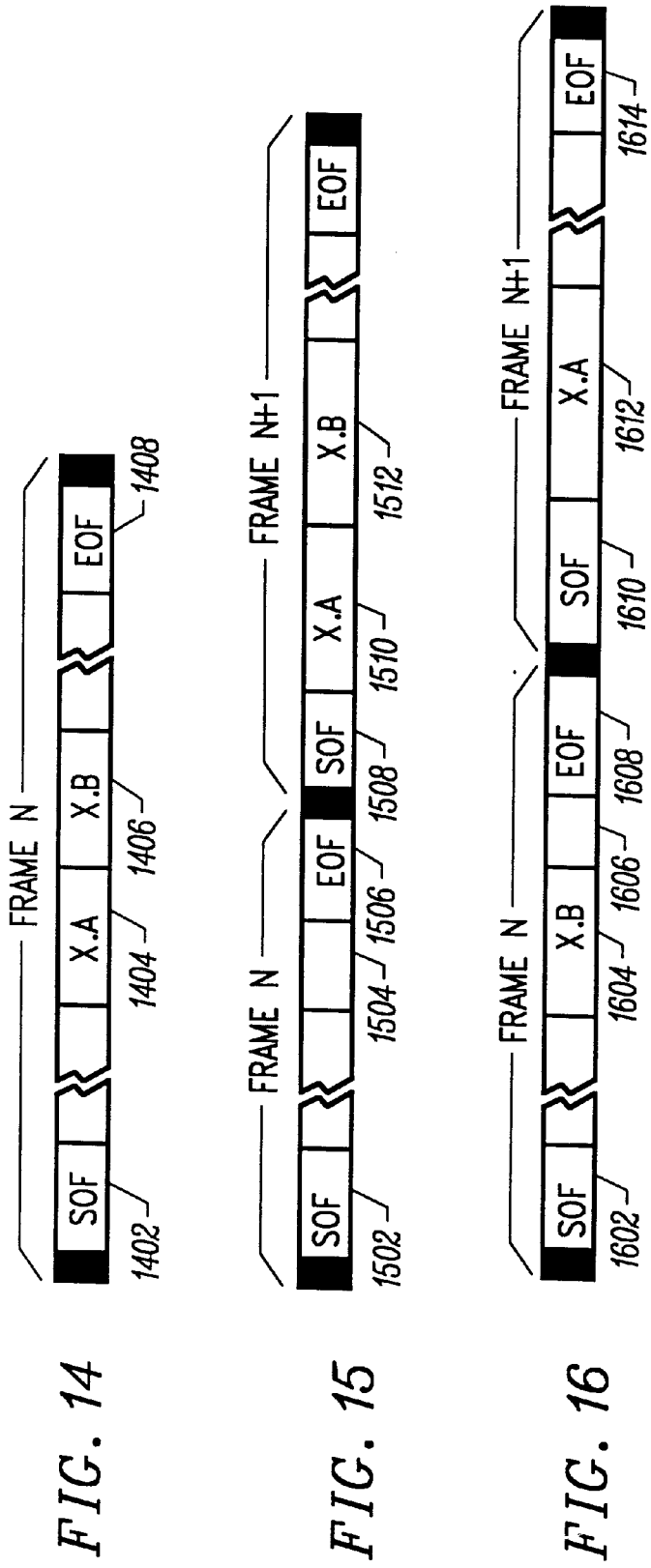

DYNAMIC SCHEDULER FOR TIME MULTIPLEXED SERIAL BUS

BACKGROUND OF THE INVENTION

1. Field of the Invention

The invention relates to time domain multiplexed serial buses, and more particularly, to dynamic scheduling mechanisms for optimally scheduling transactions on such a bus.

2. Description of Related Art

The personal computer industry has recently defined a new peripheral bus architecture and protocol, known as a Universal Serial Bus (USB). The architecture and protocol of the USB is defined in Compaq, et al., "Universal Serial Bus Specification", Rev. 1.0 (Jan. 15, 1996), and as used herein, a Universal Serial Bus is any bus which substantially conforms to that specification or to any subsequent revision thereof.

A Universal Serial Bus is organized in a "tiered star" topology, with a hub at the center of each star. A host controls the bus, and usually is connected immediately to a root hub. One or more "USB devices" are connected in a star topology to the root hub, and such USB devices can include keyboards, mice, joysticks, fax/modems, telephony devices, and so on. The term "USB device" as used herein also includes further hubs, which may themselves constitute the center of a topological star of further USB devices. Thus, each USB device is separated on the bus from the host by some number of hubs in the serial pathway between the host and the device. The USB specification specifies a maximum topology in which no device is separated from the host by more than six hubs including the root hub.

The USB specification allows users to add and remove USB devices from the bus at any time. Whenever a hub detects the addition or removal of a device, it so notifies the host, which then determines the new USB topology in a procedure known as enumeration.

Enumeration is also performed on release from reset. During enumeration, the host assigns a unique device address to each USB device (including hubs) on the bus. The host builds a table in system memory describing the topology so that if a hub is removed at some later time, the host knows which devices to delete from its records.

Data is transferred on a Universal Serial Bus within one millisecond intervals called frames. Each frame begins with a "start of frame" (SOF) token, issued by the host at one millisecond intervals and concludes with an "end of frame" (EOF) interval, during which no device is permitted to drive the bus. The intervening portion of each frame is referred to herein as a window during which bus transactions can take place.

The USB specification supports four different dataflow models, depending on the needs of each particular endpoint. An endpoint is a logical target within a device. The four dataflow models are control transfers, bulk data transfers, interrupt data transfers and isochronous data transfers.

Control transfers are used for device configuration and can also be used for other device-specific purposes. Data delivery for control transfers is lossless.

Bulk transfers are usually used for larger amounts of data, such as for printers or scanners. Data delivery for bulk transfers is lossless, but the bandwidth that it occupies can be whatever is available and not being used for other transfer types.

Interrupt transfers are-typically small, and may be presented for transfer by a device at any time. The device specifies a minimum rate (maximum number of frames of delay) at which the USB must deliver the data. Data delivery is lossless.

Isochronous transfers are for real time, time-sensitive delivery of data. An example of isochronous data is audio information. Such data must be delivered at the appropriate time, or errors are likely to result due to buffer or frame underruns or overruns. The Universal Serial Bus specification ensures timely delivery of isochronous data by assigning specific frame numbers to the data units to be transferred; if a data unit cannot be transferred in its designated frame number, the data unit is discarded.

According to the USB specification, higher level software in the host passes "transfer sets" to a host controller (which may be hardware and/or software), which divides the transfer sets into "transactions", each having a data payload size which is no greater than a predetermined maximum size for each of the four data transfer types. It is then up to the host controller to dynamically schedule these transactions for execution on the bus, in accordance with a number of rules. First, all isochronous transactions designated for a particular frame number must take place during that frame number or be discarded. Second, all interrupt transactions must take place within the time specified by the device. Third, all transactions to a particular endpoint must take place in the same sequence with which they are provided to the host controller, although there is no requirement that transactions destined for different endpoints take place in the same sequence with which they are provided to the host controller. Fourth, all transactions in a frame must complete before the EOF region of the frame.

Thus, part of the job performed by the dynamic scheduler in the host controller is to determine a worst-case estimate of the duration of a particular transaction on the bus, and compare it to the time remaining in the transaction window of the current frame. If the worst-case transaction duration estimate is larger than the duration remaining in the transaction window of the current frame, then the dynamic scheduler will skip the transaction (either discarding it or saving it for possible transmission in the next frame), and go on to test the next transaction. Depending on the algorithm used in a particular dynamic scheduler implementation, the next transaction to be tested might be of the same or different transfere type, but it will always be to a different endpoint. In this manner, an attempt is made to optimize the usage rate of each frame.

The dynamic scheduler estimates a worst-case transaction duration for a particular transaction by considering the number of bytes in the data payload, whether the data transfer is inbound (toward the host) or outbound (toward a device), whether an acknowledgment is required, and whether the transaction is to take place at the normal speed or at a specification-defined low speed. The specification implies four different "transmission duration types", as the term is used herein, each of which yields a different formula for estimating the worst-case transaction duration time. They are: (1) full-speed transactions in either direction with handshake required; (2) full-speed inbound transactions with no handshake required; (3) full-speed outbound transactions with no handshake required; and (4) low-speed transactions in either direction (low-speed transactions always require handshakes).

The formula assumed by the USB specification for estimating a worst-case transaction duration assumes only two additive components: (a) a fixed delay component representing primarily the amount of time required in the worst case for a data signal to transit a round trip from the host to an endpoint at the farthest possible tier permitted by the specification; and (b) a data-dependent delay which is a function of the number of bytes in the data payload. The first of these delay components is constant for a particular transmission duration type, so these values are typically precalculated at initialization time and stored in four respective registers (one for each transmission duration type). The second of these delay components is calculated separately for each transaction whose worst-case duration is being estimated.

While the above technique of estimating the worst-case transaction duration for the various transactions does attempt to optimize bus usage, the greater the optimization, the more data can be transferred on average within each frame. The bus will be able to transfer greater amounts of data in shorter periods of time if the optimization can be improved.

SUMMARY OF THE INVENTION

As mentioned, the USB specification calls for the dynamic scheduler to estimate a worst-case duration for each transaction. For three of the four transmission duration types, this is typically calculated by assuming that the transaction requires a round trip data transfer to the most distant hub permitted by the specification. Thus the delay is estimated as five times the maximum hub and inter-hub cable delay, plus the maximum delay through the root hub, plus all other fixed delays when the host sends a packet out onto the bus, plus the maximum permitted turnaround time and other delays before a device must drive the bus with a return transmission (collectively, a fixed delay), plus the bit time required to transmit the number of bytes in the actual data payload (a data-dependent delay). The fixed delays are different for each of the four transmission duration types. (For full-speed outbound transactions with no handshake required, no time is allocated for hub or cable transmission delays.)

In actuality, many systems will not include hubs out to the maximum hub depth permitted by the specification. In many systems, the largest hub depth on the bus will be only two or three. Accordingly, in an aspect of the invention, roughly described, during initialization or enumeration, the host system determines the highest hub depth $h_{high}$ of any device actually present on the USB. The worst-case hub depth-dependent delay is then calculated in dependence upon $h_{high}$, rather than in dependence upon the maximum hub depth permitted by the specification. The result is added to estimates of the worst-case fixed delays for each of the four transmission duration types, and stored in four corresponding registers. The dynamic scheduler later estimates the worst-case transaction duration time for each given transaction in the usual manner, except that the constant it assumes for the fixed delay component of the estimate (the component which does not depend on the byte count in the transaction's payload) is the appropriate one of the four constants precalculated during initialization or enumeration.

Unless the USB has the fully extended topology, using hubs to the maximum permitted hub depth, these constants will be smaller and more precise than those in the prior art and will therefore result in a smaller and more precise estimate of the transaction duration time. A greater probability exists, therefore, that the transaction will be able to be executed during the current frame, thereby improving the usage of the USB.

In another aspect of the invention, roughly described, instead of estimating transaction duration times in dependence upon the largest hub depth actually on the bus, the dynamic scheduler estimates transaction duration times in dependence upon the actual hub depth of the device to which the transaction is directed. For example, on a bus having a highest hub depth of four, a particular transaction might be directed to a device having a hub depth of only two. In this case, the dynamic scheduler includes in the worst-case transaction duration estimate, only the worst-case round trip time to the actual hub depth of the device specified for the transaction.

In an embodiment of the invention incorporating this second aspect, the host, during initialization or enumeration, detects the hub depth of each device, multiplies it by an estimate of the time delay introduced for round trip transmission for each hub in the serial path between the root hub and the device, and stores the result in a table relating each of the devices with its respective hub-depth-dependent time delay. On initialization, the host also writes fixed time delay constants for each of the four transmission duration types into four corresponding registers. The dynamic scheduler, when estimating the worst-case transaction duration for a given transaction, then merely adds three components: the fixed delay constant for the transmission duration type of the given transaction; the hub-depth-dependent worst-case delay estimate from the preconstructed table (or from another source, such as an endpoint descriptor for the endpoint of the given transaction); and a product of a worst-case byte transmission time and the number of bytes in the data payload of the given transaction.

Applicant has noted that for one of the transmission duration types which are possible on the Universal Serial Bus (outbound data transactions without acknowledgment), the host does not need to wait for a round trip data transmission before beginning the immediately subsequent transaction. In other words, transactions having this transmission duration type will not have any delay introduced because of cables and hubs in the serial path between the host and the USB device. Accordingly, in yet another aspect of the invention, the dynamic scheduler recognizes transactions which have this transmission duration type and, for such transactions, does not include any hub-depth-dependent delay in its estimate of the worst-case transaction duration.

All of these techniques provide better estimates of the worst-case duration for any given transaction, and therefore improve the probability that any given transaction will be able to take place within a frame. Bandwidth usage is therefore improved and the bus tends to operate faster.

BRIEF DESCRIPTION OF THE DRAWINGS

The invention will be described with respect to particular embodiments thereof, and reference will be made to the drawings, in which:

FIG. 11 is a block diagram of an embodiment of the transaction window counter of FIG. 9.

FIG. 12 is a block diagram of the transaction duration calculator of FIG. 9.

FIG. 13 is a block diagram illustrating a variation of the transaction duration calculator of FIG. 12.

FIGS. 14–16 illustrate three examples of frame time usage on the USB of FIG. 1.

DETAILED DESCRIPTION

I. Hardware Architecture and General Operation

Figure 1:
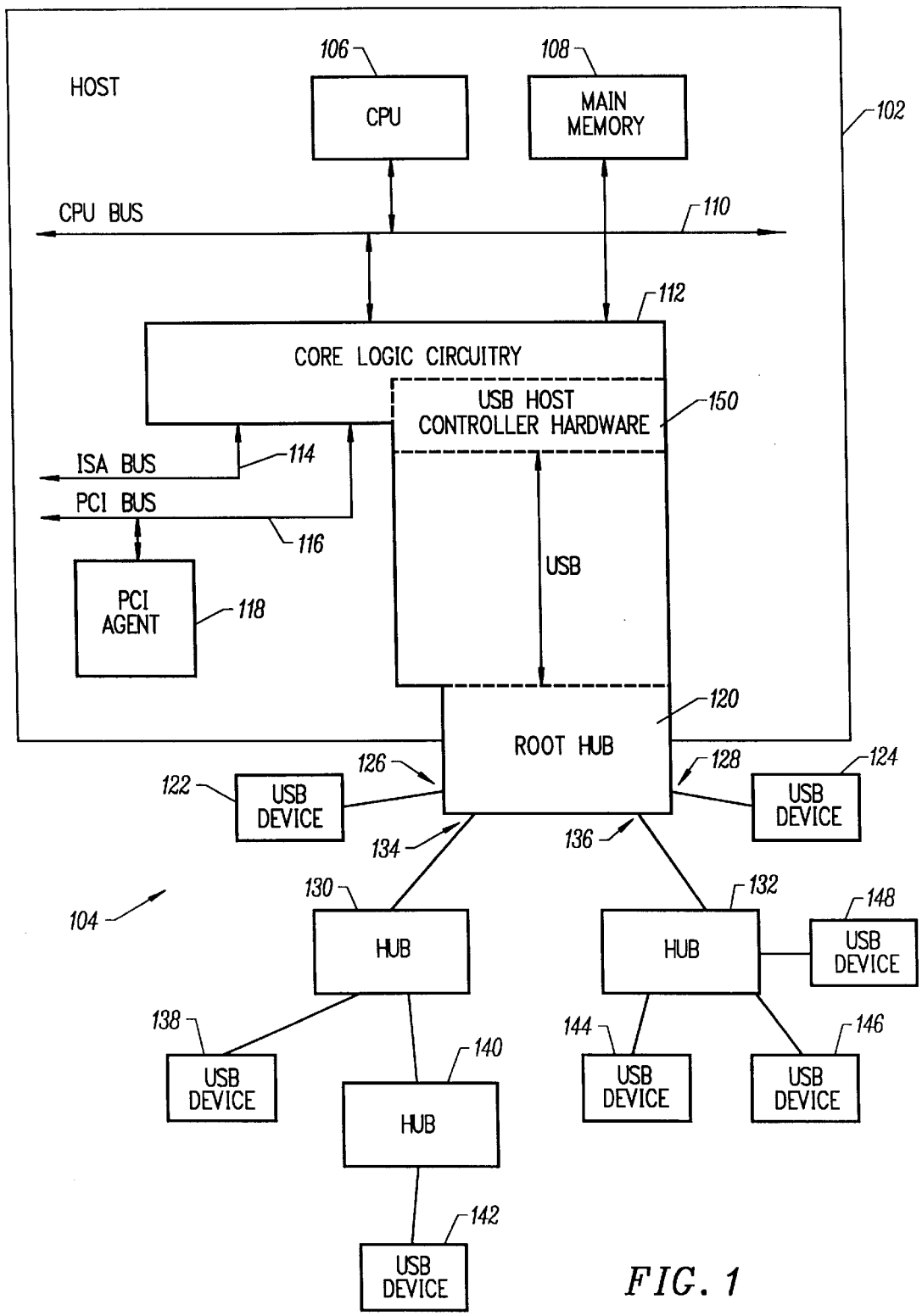
FIG. 1 is an overall block diagram of a computer system incorporating the invention.

FIG. 1 is an overall block diagram of a computer system incorporating the invention. It comprises a host 102 and a Universal Serial Bus 104. The host includes a CPU 106 coupled to a CPU bus 110, and a main memory subsystem 108 coupled to core logic circuitry 112. Core logic circuitry 112 is also coupled to the CPU bus 110, and includes interfaces to an ISA (Industry Standard Architecture) bus 114, a PCI (Peripheral Components Interface) bus 116, and the Universal Serial Bus 104. For completeness, a PCI agent 118 is shown connected to the PCI bus 116.

On the Universal Serial Bus 104, but physically within the core logic circuitry 112, is a root hub 120. A number of USB devices and further hubs are connected as part of the USB 104, in a tiered star configuration. Specifically, two USB devices 122 and 124 are connected to respective ports 126 and 128 of the root hub 120. Hubs 130 and 132 are connected to respective ports 134 and 136 of the root hub 120. Hub 130 has a USB device 138 and a hub 140 connected to respective ports on the hub 130 and a further USB device 142 is connected to a port of the hub 140. Similarly, connected to respective ports on hub 132 are three USB devices 144, 146 and 148. Each USB device has one or more "endpoint" defined therein. In accordance with the USB specification, at least once configuration is complete, each endpoint in each device on the bus 104 can handle only one of the four dataflow types (isochronous, interrupt, control or bulk), only one speed (normal or slow), and except for control endpoints, only one data transfer direction (inbound or outbound).

Figure 2:
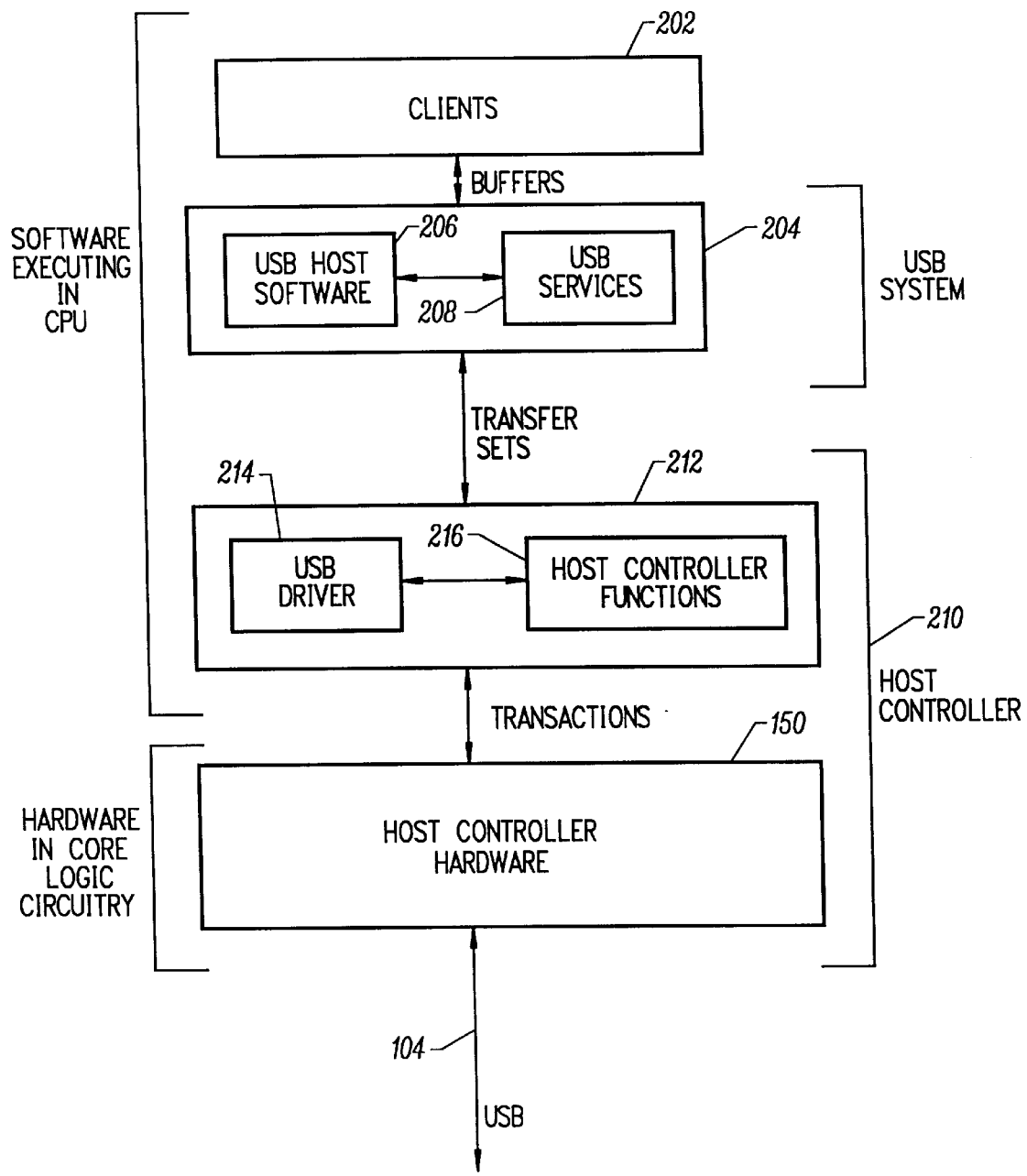
FIG. 2 is an overall block diagram of a hardware/software architecture of USB aspects of the system of FIG. 1.

The USB specification permits an implementation-specific division of functions between software and hardware in the host 102 for controlling a Universal Serial Bus. FIG. 2 illustrates the layers as implemented in the embodiment described herein. As illustrated, various software clients are running on the CPU 106. These clients communicate with the USB system 204 with the passage of data buffers. The USB system 204 has a USB host software component 206 and a USB services component 208, both executing in software running on the CPU 106.

For data that is to be transferred to or from a USB device, the USB system 204 passes "transfer sets" to a "host controller" 210. Each transfer set contains transfers of exactly one transfer type, pre-divided into the segments necessary for transmission on the bus 104. The segments are known as "transactions". Transfer sets of type isochronous, bulk or interrupt each further designate exactly one device address and endpoint number; transfer sets of the control type designate exactly one device address, but the transfer may be to either the inbound or outbound control endpoint of the designated device.

The host controller 210 includes a software component 212 and a hardware component 150 (also shown in FIG. 1 within core logic circuitry 112). The host controller software component 212, which also executes on CPU 106, is itself divided into a USB driver 214 and host controller USB functions 216. The USB functions 216 are called by the USB driver 214 in order to accomplish specific predefined tasks.

Figure 3:
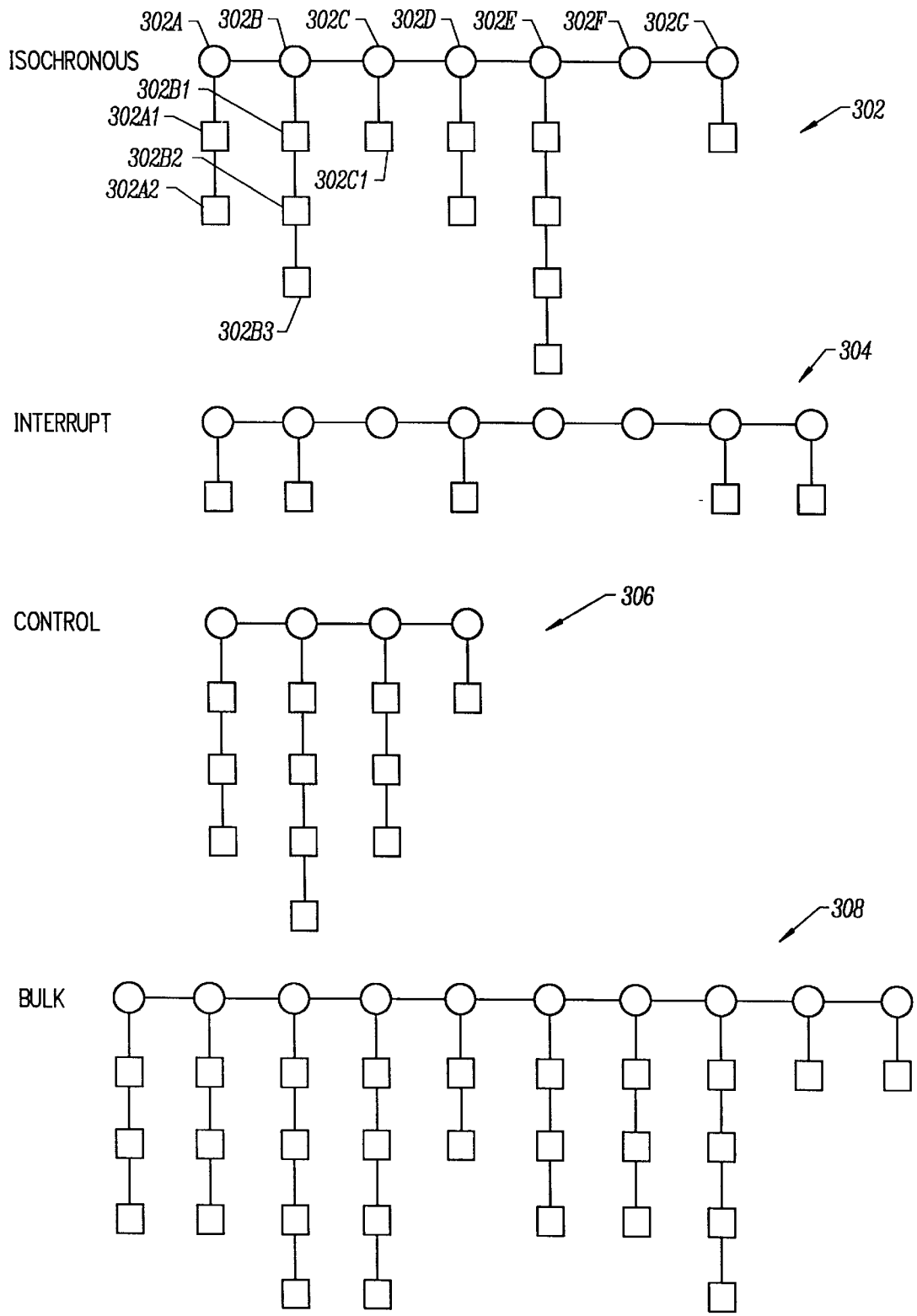
FIG. 3 is a symbolic diagram of transaction data structures.

The USB driver 214 provides the transfer sets, in the form of individual transactions, to the host controller hardware 150. Specifically, the USB driver 214 provides the transactions to the host controller hardware 150 in the-form of four endpoint descriptor lists as illustrated in FIG. 3. The four lists correspond to the four different transaction types. Each list is made up of a linked list of endpoint descriptors, one for each endpoint that has the transaction type of the list. All endpoints on the bus 104 that have the transaction type of a particular one of these lists, are represented on that particular list. Each endpoint descriptor on one of the endpoint descriptor lists further points to the head of another respective linked list of transaction descriptors.

For example, FIG. 3 illustrates the four data structures 302, 304, 306 and 308. Data structure 302 is for isochronous transactions, and includes a linked list of seven endpoint descriptors 302A–302G. Each endpoint descriptor includes, among other things, the following information (Table I):

TABLE I

Pointer to next endpoint descriptor in the endpoint descriptor list (or null).
Pointer to first transaction descriptor pending for this endpoint (or null).
Endpoint device address.
Endpoint number within device.
In certain embodiments, a hub-depth-dependent value (see below).

The endpoint descriptor 302A points to the head of a transaction descriptor linked list, containing transaction descriptors 302A1 and 302A2. Similarly, endpoint descriptor 302B points to the head of a transaction descriptor list containing transaction descriptors 302B1, 302B2 and 302B3, and so on. For illustration purposes, the transaction descriptor linked list for endpoint descriptor 302C contains only one transaction descriptor 302C1 and the endpoint descriptor 302F, at the time of the snapshot of FIG. 3, has no transaction descriptors pending. Each transaction descriptor includes, among other things, the following information (Table II):

TABLE II

Pointer to the next transaction descriptor in the transaction descriptor linked list (or null).
System-memory-resident transmit/receive data buffer start location.
Transaction direction (ignored for certain transaction types).
Transaction speed.
Byte count of data payload.
Target frame number (for isochronous transactions only).

The data structure 304 contains the endpoint descriptors and transaction descriptors for all interrupt transactions. It is similar to that set forth above for isochronous endpoints and transactions, except that the lists of transaction descriptors for interrupt transactions never exceed a single transaction descriptor.

Returning to FIG. 2, the USB system is responsible for setting up the endpoint descriptor lists in system memory 108 on initialization, and for maintaining these lists as endpoints are added or removed from the USB 104. The USB driver 214 is responsible for adding transaction descriptors to the end of the appropriate transaction descriptor lists in accordance with the transfer sets that it receives from the USB system 204, and the host controller hardware 150 is responsible for scheduling, executing and/or retiring transactions designated by the transaction descriptors at the heads of the transaction descriptor lists. Whenever the host controller hardware 150 retires a transaction, it does so by notifying the USB driver 214, which removes the retired transaction descriptor from the head of the transaction descriptor list and updates the pointer in the corresponding endpoint descriptor to point to the next transaction descriptor in the transaction descriptor list.

The host controller 210 operates in a manner that guarantees that endpoints see transactions in the order that was intended by their driver. Specifically, when the USB driver 214 builds the transaction descriptor lists, transaction descriptors from previously received transfer sets are placed on the list in front of transaction descriptors from subsequently received transfer sets. The host controller hardware 150 then executes (or retires) transactions in a transaction descriptor list only in the sequence with which they appear on the list; a transaction descriptor is never skipped in favor of a subsequent transaction descriptor on the same transaction descriptor list, even if the subsequent transaction will fit within the remaining transaction window duration and the prior transaction will not. Note there is no requirement that sequence be maintained as between different endpoints or as between different transaction types.

Figure 4:
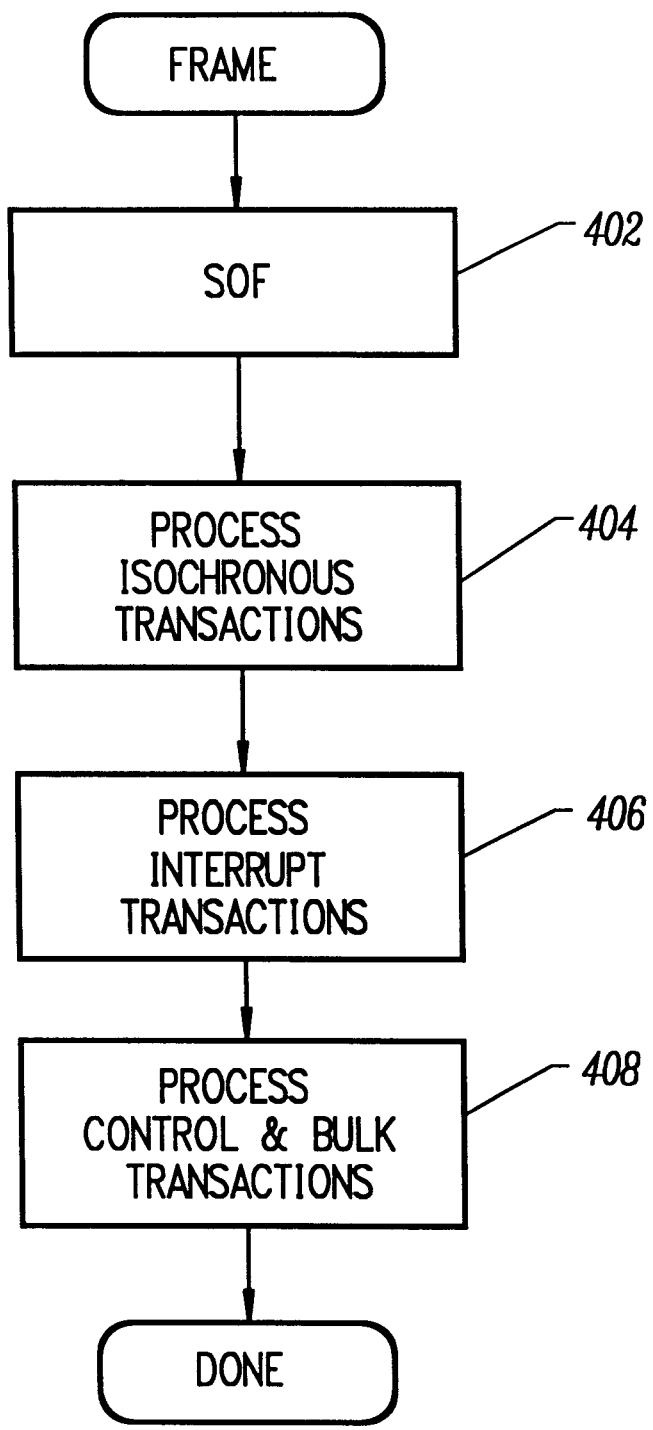
FIG. 4 is a flowchart of an algorithm for circulating through transaction descriptor data structures.

Different host controller implementations can use different algorithms for circulating through the transaction descriptor data structures as long as they meet the sequence and timing requirements set forth in the USB specification. One such algorithm is described beginning in FIG. 4. Referring to FIG. 4, at the beginning of each frame, the host controller hardware 150 issues a start of frame (SOF) token (step 402). In step 404, it executes any isochronous transactions in the data structure 302 which are designated for the current frame. No test is performed to determine whether the transaction has sufficient time to complete within the current frame, because the USB system 204 would not have allowed a new isochronous endpoint to be connected to the bus 104 if its bandwidth requirements on the bus would cause total maximum isochronous bandwidth on the bus to exceed some predetermined percentage of the available bandwidth.

After all isochronous transactions designated for execution in the current frame have been executed or retired, in step 406, the host controller hardware 150 executes the interrupt transactions in data structure 304. Before each transaction is executed, the host controller hardware estimates, in the manner described hereinafter, a worst-case transaction duration for the transaction and compares it to the duration remaining in the transaction window of the current frame. Interrupt transactions are executed in the current frame only if they will fit within the duration remaining in the transaction window of the current frame.

After all interrupt transactions have been executed, in step 408, the host controller hardware 150 executes the control and bulk transactions from data structures 306 and 308, again only to the extent that time remains in the transaction window of the current frame. Whereas other implementations can differ, the embodiment of FIG. 4 gives equal priority to control and bulk transactions.

Figure 5:
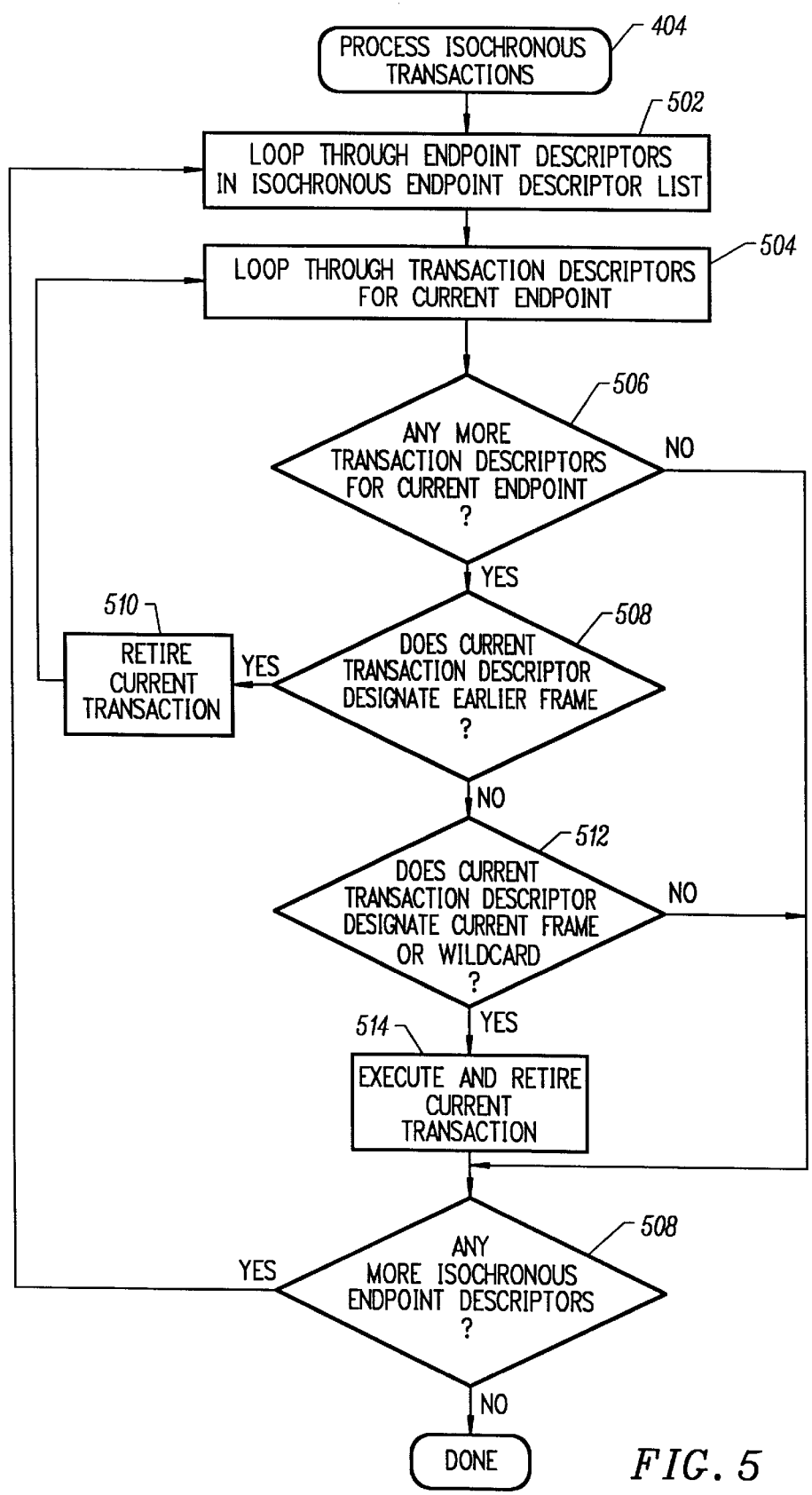
FIG. 5 is a flowchart illustrating how the host controller hardware of FIG. 1 executes isochronous transactions.

FIG. 5 is a flow chart illustrating how the host controller hardware 150 processes isochronous transactions (step 404). Specifically, in step 502, the host controller hardware 150 loops through the endpoint descriptors in the isochronous endpoint descriptor list in the data structure 302. In step 504, for each endpoint descriptor, the host controller hardware 150 loops through all of the transaction descriptors in the transaction descriptor list for the endpoint. In step 506, it is determined whether there are any (more) transaction descriptors for the current endpoint. If not, then in step 508, it is determined whether there are any more isochronous endpoint descriptors in the data structure 302. If there are no more isochronous endpoint descriptors, then the step 404 of processing isochronous transactions is complete. If there are more isochronous endpoint descriptors, then control returns to step 502 to proceed with the next endpoint descriptor in the data structure 302.

If in step 506 it is determined that there is a transaction descriptor for the current endpoint, then in step 508 it is determined whether the transaction descriptor designates an earlier frame that the current frame. If so, then the transaction is retired without being executed (step 510), and control returns to step 504 to process the next transaction descriptor for the current endpoint. If the current transaction descriptor does not designate an earlier frame, then in step 512 it is determined whether the transaction descriptor designates the current frame (or contains a wild card). If it does, then in step 514, the host controller hardware 150 executes and retires the current transaction. Control then passes to step 508 to determine whether there are any more isochronous endpoint descriptors. If in step 512, the current transaction descriptor designates a future frame, then the host controller hardware 150 does not execute the transaction at this time, nor does it continue processing transaction descriptors further down the transaction descriptor list for the current endpoint. Rather, if there are any more endpoint descriptors in the data structure 302 (step 508), then it returns to step 502 to process the next endpoint descriptor. If there are no more endpoint descriptors in the data structure 302, then the host controller hardware 150 continues with step 406, executing interrupt transactions.

Figure 6:
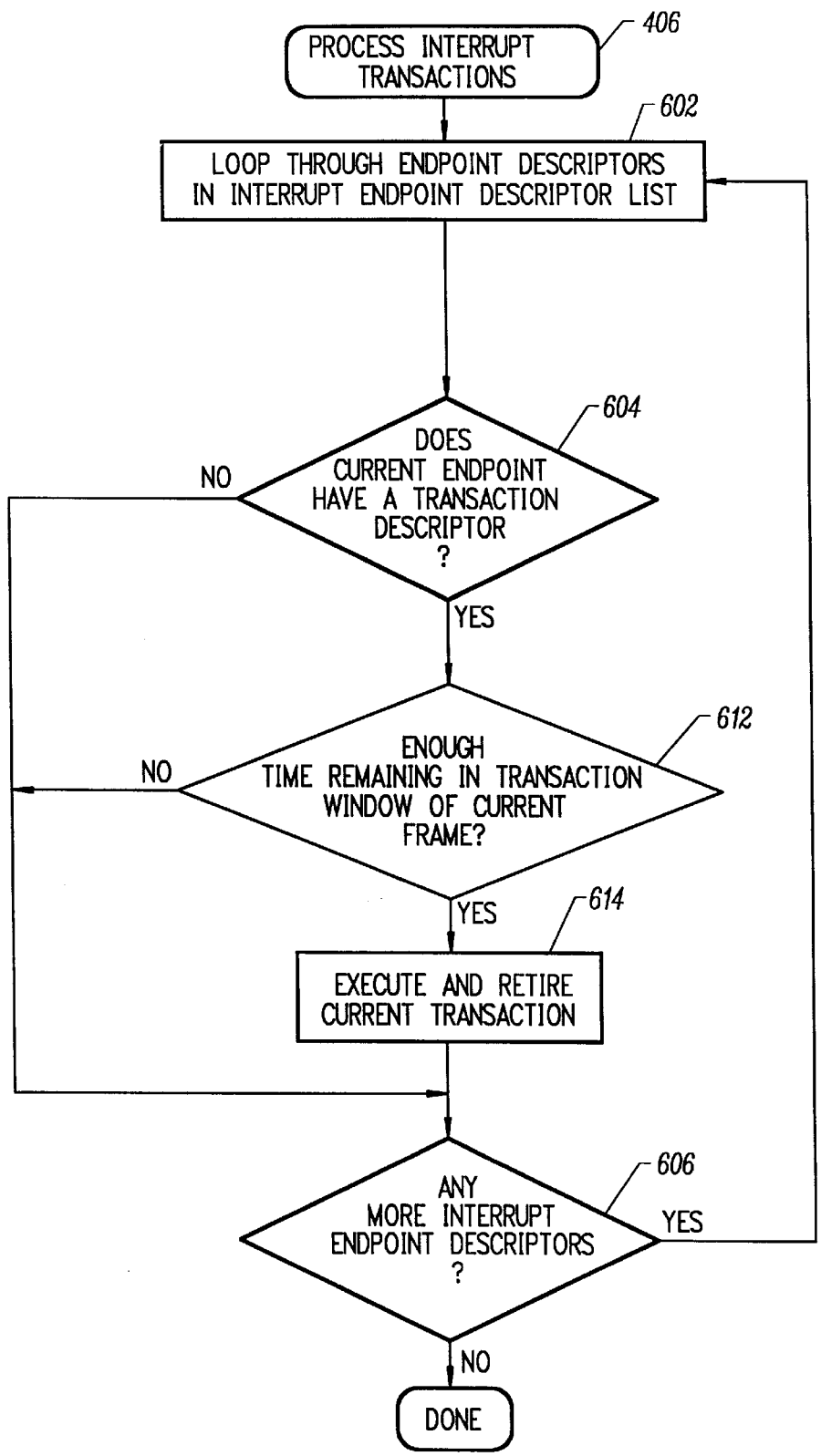
FIG. 6 is a flowchart illustrating the execution of interrupt transactions.

FIG. 6 is a flow chart illustrating the processing of interrupt transactions. In a step 602, the host controller hardware 150 begins looping through the endpoint descriptors in the interrupt endpoint descriptor list in data structure 304. In a step 604, the host controller hardware 150 determines whether the current endpoint has a transaction descriptor. If not, then control transfers to a step 606, where it is determined whether there are any more interrupt endpoint descriptors in the data structure 304, and if so, then to return to step 602 to process the next interrupt endpoint descriptor.

If the current endpoint does have a transaction descriptor, then in a step 612, if the time to send the current transaction has not yet expired, the host controller hardware 150 makes a determination as to whether there is sufficient time remaining in the transaction window of the current frame to execute the current transaction. Step 612 is described in more detail hereinafter. If there is not enough time, then control transfers to step 606 again to process the next endpoint descriptor. Only if enough time remains in the transaction window of the current frame, does the host controller hardware 150 execute and retire the current transaction (step 614) in the current frame. When the host controller hardware 150 has processed all of the interrupt endpoint descriptors in the data structure 304, it goes on to step 408 to process control and bulk transactions.

Figure 7:
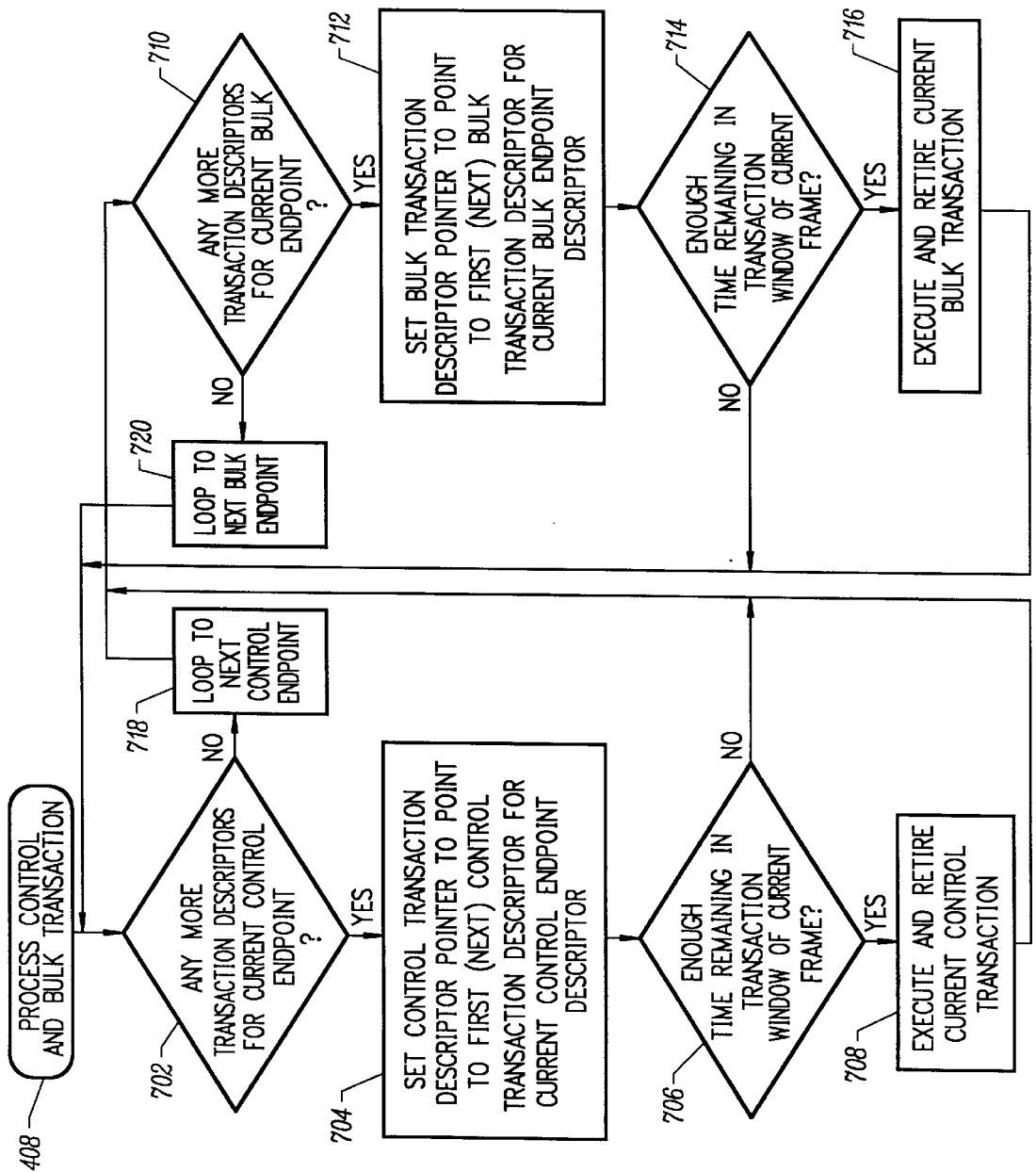
FIG. 7 is a flowchart illustrating an algorithm for selecting among waiting control and bulk transactions for execution on the USB of FIG. 1.

FIG. 7 is a flow chart illustrating one algorithm for selecting among pending control and bulk transactions for execution on the USB 104. As mentioned above, the implementation described herein gives equal priority, to control and bulk transactions. The flow chart of FIG. 7 accomplishes this by considering nodes on the data structures 306 and 308 in an alternating manner. In particular, if a transaction from the control transaction data structure 306 is executed, then the next transaction considered for execution is a transaction in the bulk transaction data structure 308, and vice versa.

If a transaction from control transaction data structure 306 is considered but skipped because there is insufficient time remaining in the transaction window of the current frame, then in the algorithm of FIG. 7, the next transaction to be considered for execution will come from the bulk transaction data structure 308 rather than another transaction in the control transaction data structure 306. In another embodiment, the scheduler could instead try another transaction in the control transaction data structure 306.

Similarly, if a transaction from bulk transaction data structure 308 is considered but skipped because there is insufficient time remaining in the transaction window of the current frame, then in the algorithm of FIG. 7, the next transaction to be considered for execution will come from the control transaction data structure 306 rather than another transaction in the bulk transaction data structure 308. In another embodiment, the scheduler could instead try another transaction in the bulk transaction data structure 308.

Also, if the host controller hardware 150 is moving to the next transaction descriptor in the transaction descriptor list associated with a particular endpoint descriptor in the control transaction data structure 306, and finds that there are no more transaction descriptors in that particular transaction descriptor list, then in the embodiment of FIG. 7, the host controller hardware 150 advances the endpoint descriptor pointer to point to the next endpoint descriptor in the control transaction data structure 306 but looks for the next transaction in the bulk transaction data structure 308 rather than immediately looking for the first transaction descriptor associated with the new control endpoint descriptor in the data structure 306. Similarly, if the host controller hardware 150 is moving to the next transaction descriptor in the transaction descriptor list associated with a particular endpoint descriptor in the bulk transaction data structure 308, and finds that there are no more transaction descriptors in that particular transaction descriptor list, then it advances the endpoint descriptor pointer to point to the next endpoint descriptor in the bulk transaction data structure 308 but looks for the next transaction in the control transaction data structure 306 rather than immediately looking for the first transaction descriptor associated with the new bulk transaction endpoint descriptor in the data structure 308. Again, in another embodiment, the host controller hardware could, after reaching the end of a transaction descriptor list, immediately look for the next transaction descriptor in the same data structure but under the next endpoint descriptor.

Referring to FIG. 7, the algorithm described therein represents a continuous loop which terminates at the end of the transaction window of whichever frame is the current frame. During each frame, after isochronous and interrupt transactions are processed, the flow chart of FIG. 7 is re-entered at step 702. The host controller hardware 150 maintains a pointer to a "current control endpoint" in the data structure 306, a pointer to a "current control transaction descriptor" in the data structure 306, a pointer to a "current bulk endpoint descriptor" in the data structure 308, and a pointer to a "current bulk transaction descriptor" in the data structure 308.

In step 702, it is determined whether there are any more transaction descriptors associated with the current control endpoint in data structure 306. If so, then the host controller hardware 150 sets the control transaction descriptor pointer to point to the next control transaction descriptor associated with the current endpoint descriptor (step 704). In step 706, it is determined whether enough time remains in the transaction window of the current frame to execute the transaction described by the current control transaction descriptor, and if so, in step 708, the current control transaction is executed and retired. Then, in step 710, it is determined whether there are any more transaction descriptors for the current bulk endpoint descriptor. If so, then the host controller hardware 150 sets the bulk transaction descriptor pointer to point to the next bulk transaction descriptor associated with the current bulk endpoint descriptor in the data structure 308 (step 712), and in step 714 it is determined whether there is enough time remaining in the transaction window of the current frame to execute the transaction described by the now-current bulk transaction descriptor. If so, then in step 716, the host controller hardware 150 executes and retires the bulk transaction described by the current bulk transaction descriptor in data structure 308. The algorithm then loops back to 702 to look for the next transaction in the control data structure 306 for execution on the USB 104.

If, in step 702, it was determined that there are no more transaction descriptors for the current control endpoint, then in step 718, the host controller hardware 150 updates current control endpoint descriptor pointer to point to the next endpoint descriptor in the endpoint descriptor list of data structure 306. If it has reached the end of the control endpoint descriptor list, then it loops back and points to the first endpoint descriptor on the list. The algorithm then continues with step 710, looking for the next transaction from the bulk transaction description data structure 308. Also, if in step 706 it is determined that there is not enough time remaining in the transaction window of the current frame, to execute the transaction described by the current control transaction descriptor, then the algorithm also proceeds with step 710 to look for the next transaction in the bulk transaction descriptor data structure 308.

Similarly, if, in step 710, it is determined that there are no more transaction descriptors for the current bulk endpoint, then in step 720, the host controller hardware 150 updates current bulk endpoint descriptor pointer to point to the next endpoint descriptor in the endpoint descriptor list of data structure 308. If it has reached the end of the bulk endpoint descriptor list, then it loops back and points to the first endpoint descriptor on the list. The algorithm then returns to step 702, looking for the next transaction from the control transaction description data structure 306. Similarly, if in step 714 it is determined that there is not enough time remaining in the transaction window of the current frame, to execute the transaction described by the current bulk transaction descriptor, then the algorithm also proceeds with step 702 to look for the next transaction in the control transaction descriptor data structure 306.

Figure 8:
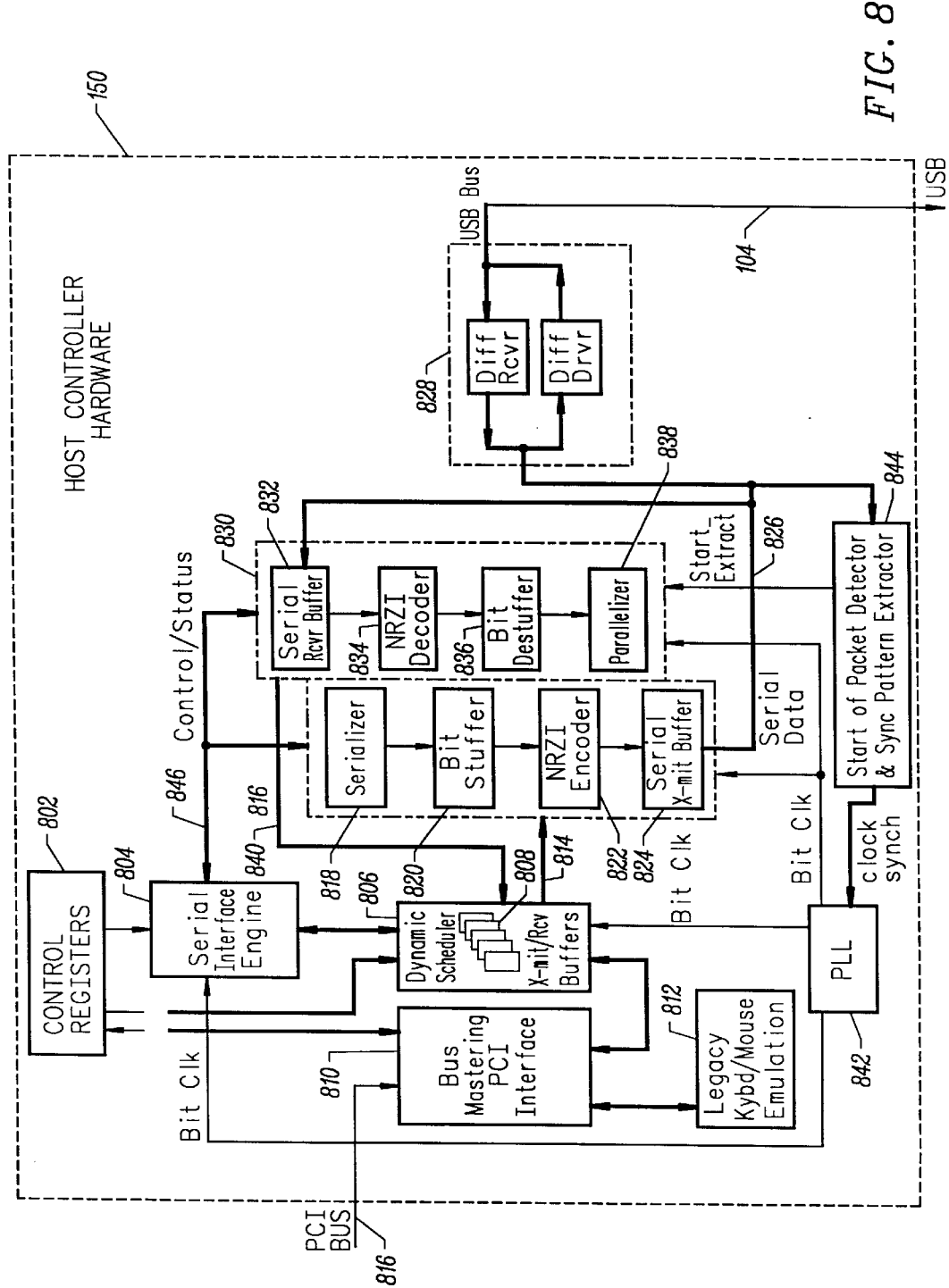
FIG. 8 is a block diagram of the host controller hardware of FIG. 2.

FIG. 8 is a block diagram of the host controller hardware 150 (FIG. 2). It comprises a set of control registers which may be scattered throughout the core logic circuitry 112, but which are all shown for convenience as 802 in FIG. 8. A serial interface engine 804 is connected to the control registers 802 and also to a dynamic scheduler 806 which contains a plurality of transmit/receive buffers 808. The dynamic scheduler 806 is connected to a bus mastering PCI interface 810, which is also connected to some of the control registers 802, and which is connected further to the PCI bus 116 internally to the core logic circuitry 112. The bus-mastering PCI interface 810 is also connected to a legacy keyboard/mouse emulation unit 812.

The dynamic scheduler 806 has a parallel output data bus 814 connected to an input port of a serializing output data path 816. The output data path 816 includes a serializer 818, followed by a bit stuffer 820 (as required for NRZI encoding), followed by an NRZI encoder 822, followed by a serial transmit buffer 824. The output data path 816 has a serial data output 826, which is connected to a differential transceiver 828, which drives and receives from the Universal Serial Bus 104.

The serial data bus 826 is also connected to a serial input port of a parallelizing input data path 830. The input data path 830 includes a serial receive buffer 832, followed by an NRZI decoder 834, followed by a bit destuffer 836, followed by a parallelizer 838. The parallel output of the input data path 830 is provided over a parallel input bus 840 back to the dynamic scheduler 806.

The host controller hardware 150 also includes a phase lock loop 842 which generates a bit clock for the serial interface engine 804 and for the input and output data paths 816 and 830. The bit clock signal is also supplied to the dynamic scheduler 806.

In addition, the host controller hardware includes a "start of packet" detector and sync pattern extractor unit 844, which has an input port connected to the serial data bus 826. It generates a start_extract signal for the input data path 830 and a clock synchronization signal for the phase lock loop 842. The serial interface engine 804 is also coupled to the input and output data paths 816 and 830, respectively, via a control/status bus 846.

The control registers 802 contain a number of registers which are writable by the CPU 106. Those hat are pertinent to the present discussion include hose set out in Table III.

TABLE III

Transaction duration constant $C_1$ for transmission duration type I transactions (full-speed transactions with handshake).
Transaction duration constant $C_2$ for transmission duration type II transactions (full-speed transactions with inbound data and without handshake).
Transaction duration constant $C_3$ for transmission duration type III transactions (full-speed transactions with outbound data, without handshake).
Transaction duration constant $C_4$ for transmission duration type IV transactions (all low-speed transactions).
Frame number for current isochronous transaction descriptor; valid bit.
Pointer to current isochronous endpoint descriptor; valid bit.
Pointer to current isochronous transaction descriptor; valid bit.
Pointer to current interrupt endpoint descriptor; valid bit.
Pointer to current interrupt transaction descriptor; valid bit.
Pointer to current control endpoint descriptor; valid bit.
Pointer to current control transaction descriptor; valid bit.
Pointer to current bulk endpoint descriptor; valid bit.
Pointer to current bulk transaction descriptor; valid bit.
Pointer to memory-resident transmit/receive data buffer for current isochronous transaction; valid bit.
Pointer to memory-resident transmit/receive data buffer for current interrupt transaction; valid bit.
Pointer to memory-resident transmit/receive data buffer for current control transaction; valid bit.
Pointer to memory-resident transmit/receive data buffer for current bulk transaction; valid bit.
Transaction register for current isochronous transaction (device address, endpoint number, byte count, direction of data transmission, transaction speed; valid bit.
Transaction register for current interrupt transaction (device TABLE III-continued address, endpoint number, byte count, direction of data transmission, transaction speed; valid bit.
Transaction register for current control transaction (device address, endpoint number, byte count, direction of data transmission, transaction speed; valid bit.
Transaction register for current bulk transaction (device address, endpoint number, byte count, direction of data transmission, transaction speed; valid bit.

In addition, as will be seen, in one embodiment of the invention, the control registers 802 also include those set forth in Table IV.

TABLE IV

Hub-depth-dependent delay value for current interrupt transaction; valid bit.
Hub-depth-dependent delay value for current control transaction; valid bit.
Hub-depth-dependent delay value for current bulk transaction; valid bit.

Figure 9:
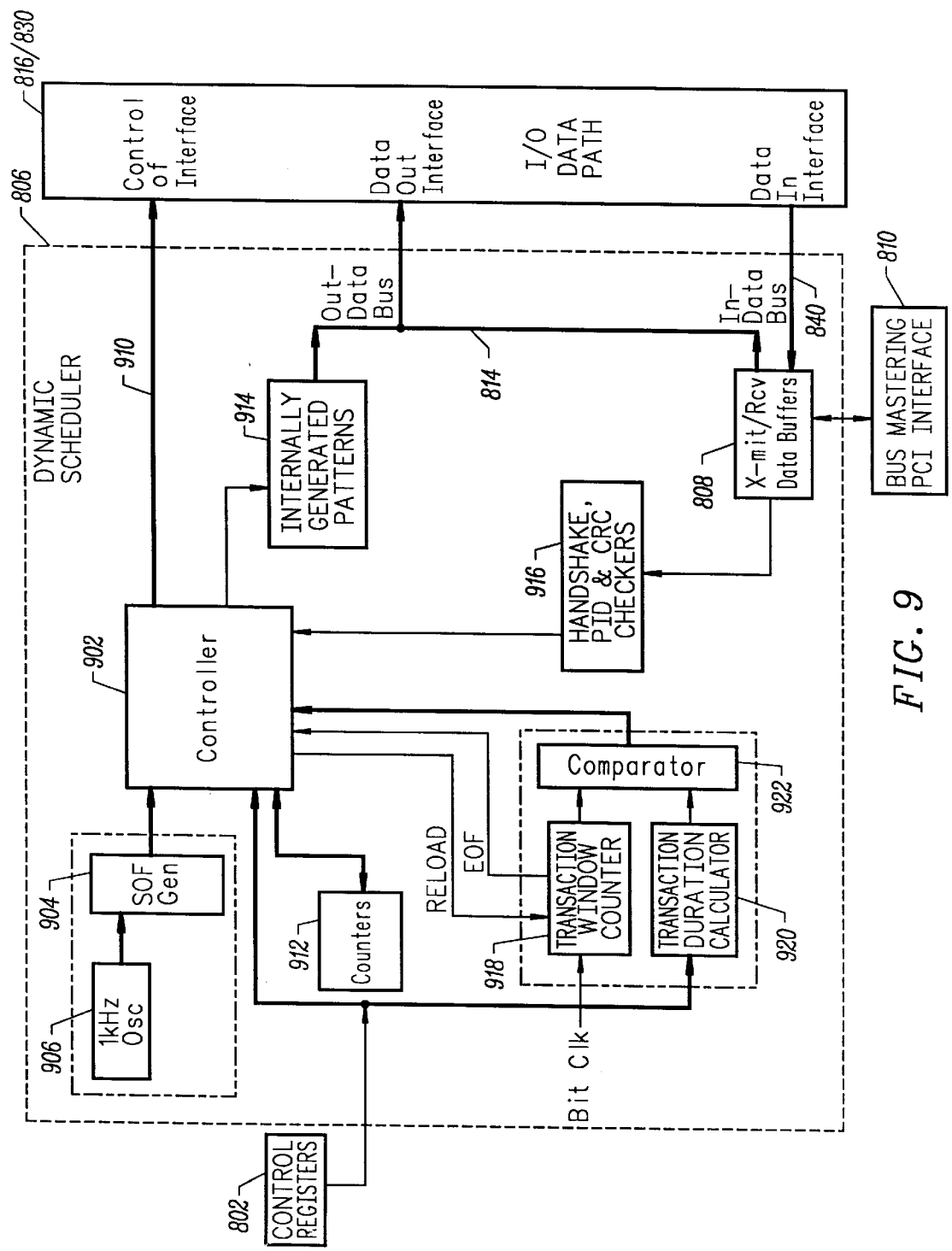
FIG. 9 is a block diagram of the dynamic scheduler of FIG. 8.

FIG. 9 is a block diagram of the dynamic scheduler 806 (FIG. 8). It includes a controller 902 which controls all of the internal operations of the dynamic scheduler 806. The controller 902 receives a signal from a start-up frame (SOF) generator 904, which is connected to receive the output of a 1 kHz oscillator. The controller 902 is also connected to the control registers 802, and is also connected via signals 910 to control the input and output data paths 816 and 830, respectively. The controller 902 is also connected to a set of counters 912, including an 11-bit "current frame number" counter. The internal transmit/receive data buffers 808 are connected to the output data bus 814, which also receives, at different times under the control of controller 902, any of several internally generated patterns 914. Such patterns include packet identification numbers (PIDs), the current frame number, and CRC codes. The transmit/receive data buffers 808 are also connected to the input data bus 840 and to handshake, PID and CRC checkers 916, which provide signals to the controller 902. The transmit/receive data buffers 808 are also connected for bi-directional data transfer to the bus mastering PCI interface 810 (FIG. 8).

The dynamic scheduler 806 also includes a transaction window counter 918 and a transaction duration calculator 920. The transaction window counter 918 receives a re-load signal from the controller 902 at the beginning of a frame, and then counts down in accordance with the bit clock signal from the phase lock loop 842 (FIG. 8). At the end of the transaction window of the current frame, the transaction window counter 918 issues an end-of-frame (EOF) signal to the controller 902 so as to prevent the host controller hardware 150 from any further driving of the USB 104 during the end-of-frame region.

The transaction duration calculator 920 is connected to the control registers 802. The transaction window counter 918 and the transaction duration calculator 920 each have output ports connected to respective input ports of a comparator 922, the output of which is provided back to the controller 902. The transaction duration calculator 920 is described in more detail hereinafter.

Whereas the flow charts of FIGS. 4–7 describe the transaction scheduling in execution algorithm in linear form, it will be appreciated that an implementation can perform the steps of the algorithm in a highly pipelined manner. This is the case in the presently described embodiment in which several processes take place independently and in parallel with each other. In particular, the steps of looping through endpoint descriptors, determining whether a current endpoint descriptor has a transaction descriptor or a next transaction descriptor, and updating endpoint descriptor pointers and transaction descriptor pointers to point to the next respective descriptor (for example, steps 502, 504, 506, 508, 602, 604, 606, 702, 704, 710, 712, 718 and 720) operate as follows.

First, before the USB driver 214 enables the host controller hardware 150 for operation, the host controller driver 214 copies the pointers to the heads of each of the four endpoint descriptor lists from main memory 108 into the respective endpoint descriptor pointer registers in the control registers 802. After being enabled, the serial interface engine 804 finds the first (next) transaction descriptor for the current isochronous endpoint descriptor by causing the PCI interface 810 to master the PCI bus 116 and read, from the current isochronous endpoint descriptor in main memory 108, the field which contains the pointer to the first isochronous transaction descriptor for the current endpoint descriptor. The serial interface engine 804 also at this time extracts the target address and endpoint number from the current isochronous endpoint descriptor in main memory 108 and writes them into the isochronous transaction register in control registers 802. In step 506, the serial interface engine 804 determines that there are no more transaction descriptors for the current isochronous endpoint descriptor by detecting a null value in this field. If the field is not null, then the serial interface engine 804 writes the pointer to the first transaction descriptor for the current isochronous endpoint into the appropriate pointer register in control registers 802.

To accomplish steps 508 and 512, the serial interface engine 804 again masters the PCI bus to read from the isochronous transaction descriptor now pointed to by the isochronous transaction descriptor pointer register in control registers 802. Among other things, the engine extracts the system memory resident transmit/receive data buffer start location and writes it to the isochronous transmit/receive data buffer pointer register in control registers 802, and sets the valid bit. It also extracts the transaction direction, byte count and transaction speed for the current isochronous transaction, and writes them into the isochronous transaction register in control registers 802. The engine then reads the field containing the frame number for the current isochronous transaction and stores it in the "first frame number" register in control registers 802. The host controller hardware 150 now has both the current frame number in one of the counters 912, and the frame number designated for the current isochronous transaction descriptor in the appropriate control register 802, and can compare them to accomplish steps 508 and 512.

If the algorithm reaches step 514, in which the current isochronous transaction is to be executed, then this step is performed by the dynamic scheduler 806 upon command from the serial interface engine 804. If the dynamic scheduler 806 is not yet ready to receive such a command, then the serial interface engine 804 stalls until it is. Once the dynamic scheduler 806 accepts the command, the serial interface engine 804 does not need to wait for the transaction to complete over the USB; rather, it proceeds with step 504 by gain mastering the PCI bus to extract the pointer, in the current isochronous transaction descriptor, which points to the next isochronous transaction descriptor or null).

Similarly, the serial interface engine 804 performs step 604 (FIG. 6) by mastering the PCI bus 116 to extract, from the current interrupt endpoint descriptor, the target address and endpoint number and writes them into the interrupt transaction register. The serial interface engine 804 also extracts the pointer to the first interrupt transaction descriptor for the current endpoint. If it is null, then there are no interrupt transaction descriptors for the current interrupt endpoint descriptor, and in step 606, the serial interface engine 804 again masters the PCI bus 116 in order to proceed to the next interrupt endpoint descriptor (if any).

The serial interface engine 804 performs step 612 by again mastering the PCI bus 116 and extracting from the current interrupt transaction descriptor, the system memory resident transmit/receive data buffer start location for the current interrupt transaction, and writing it to the interrupt transmit/receive data buffer pointer register in control registers 802, and setting the valid bit. It then extracts the transaction direction, byte count and transaction speed for the current interrupt transaction, and writes them into the interrupt transaction register and sets the valid bit.

The determination of whether enough time remains in the transaction window of the current frame to execute the current interrupt transaction (step 612), is performed by dynamic scheduler 806 in a manner described hereinafter. If the algorithm reaches step 614, in which the current interrupt transaction is to be executed, then the algorithm again stalls until the dynamic scheduler is ready to do so. Subsequently, the serial interface engine 804 performs step 606 by again mastering the PCI bus 116 to extract the pointer to the next interrupt endpoint descriptor (or null), from the current interrupt endpoint descriptor.

In the same manner as set forth above with respect to isochronous and interrupt transactions (FIGS. 5 and 6), the serial interface engine 804 performs steps 702, 704, 710, 712, 718 and 720 (FIG. 7) for the control and bulk transactions.

In parallel with the serial interface engine 804 operation just described, the dynamic scheduler 806 also performs two concurrent processes: (1) controlling the transactions on the USB 104 which have been released for execution; and (2) reading and writing data between the transmit/receive data buffers 808 and the system memory resident transmit/receive data buffers, by transfer over the PCI bus 116.

Figure 10:
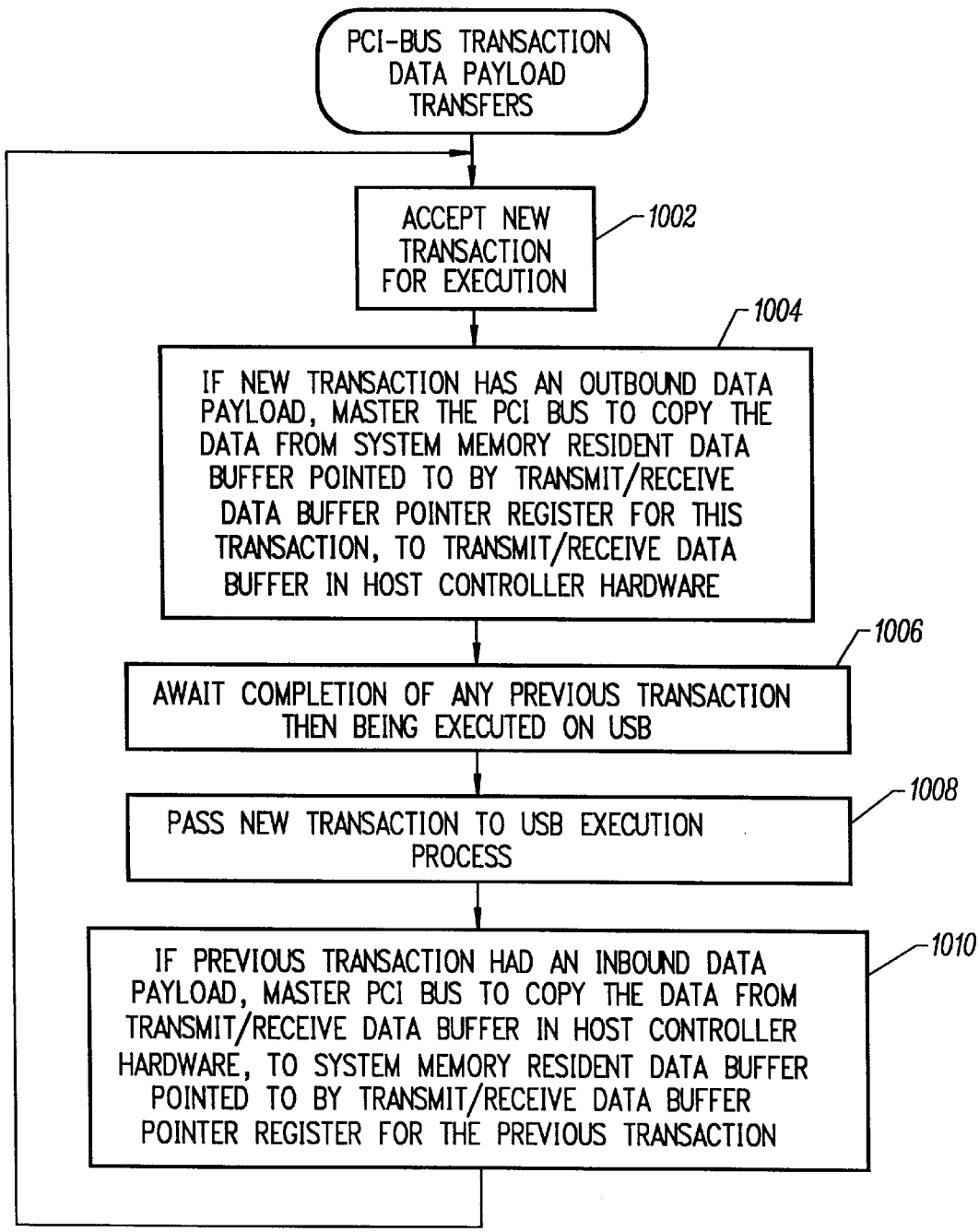
FIG. 10 is a flowchart of the operation of the dynamic scheduler of FIG. 8 for interfacing with the PCI bus of FIG. 1.

FIG. 10 is a flowchart setting forth the steps performed by dynamic scheduler 806 to read and write the data between the transmit/receive data buffers 808 and the system memory resident transmit/receive data buffers, by transfer over the PCI bus 116. In step 1002, the dynamic scheduler 806 accepts a new transaction for execution. For transactions having an outbound data payload, the dynamic scheduler 806 first causes the PCI interface 810 to master the PCI bus 116 to copy the payload from the system resident transmit/receive data buffer pointed to by the transmit/receive buffer pointer register for the current transaction, into the appropriate transmit/receive data buffer 808 (step 1004). This transfer can take place while any preceding transaction is continuing on the USB 104, but the process then stalls until such preceding transaction on the USB 104 is complete (step 1006). At that time, in step 1008, the new transaction is passed to the USB execution process for execution on the USB 104. While the new transaction takes place on the USB 104, if the previous transaction had an inbound data payload, the PCI-bus transaction data payload transfer process of dynamic scheduler 806 masters the PCI bus to copy the data from the transmit/receive data buffer in the host controller hardware 150, to the system memory resident data buffer pointed to by the transmit/receive data buffer pointer register for the previous transaction (step 1010). Only then can the process accept the next new transaction for execution (step 1002).

When the USB execution process receives a new transaction to execute on the USB 104 (step 1008), the steps that it performs depend on the transmission duration type of the transaction and are well-defined in the USB specification and need not be described in detail here. Briefly, however, each transaction begins with an outbound packet containing a "token" that identifies the kind of transaction that is about to take place. If the transaction has an outbound data payload, then the host controller hardware 150 follows the token immediately with the data. If a handshake is required, then after the data is transmitted, the host controller hardware 150 stops driving the USB 104 and waits for the handshake packet from the target device. Once the handshake packet is received, the host controller hardware 150 can drive the bus with the token for the next transaction. If no handshake is required, then the host controller hardware can follow the outbound data immediately with the token for the next transaction. If the transaction calls for an inbound data payload, then after the host controller hardware 150 drives a token onto the USB 104, it then tops driving the bus and waits for the inbound data. After the data is received, if a handshake is required, the host controller hardware 150 then drives the handshake packet onto the USB 104 and can follow immediately with the token for the next transaction. If no handshake is required, then the host controller hardware 150 can follow receipt of the inbound data with the token for the next transaction immediately.

Transaction Duration Estimation and Comparison with Time Remaining

Referring again to the flow charts of FIGS. 4–7, the dynamic scheduling algorithm calls for the dynamic scheduler 806 to determine whether enough time remains in the transaction window of the current frame to execute the transaction currently being considered. The dynamic scheduler 806 makes this determination with the aid of the transaction window counter 918, the transaction duration calculator 920, and the comparator 922.

FIG. 11 is a block diagram of an embodiment of the transaction window counter 918. It comprises a down counter 1102 having a load count input port and a count output port. The counter 1102 has a load control input connected to receive the reload signal from controller 902, and has a borrow output which provides the EOF signal to the controller 902. The down counter 1102 also has a clock input connected to receive the bit clock signal from the phase-lock loop 842. The count output port of the down counter 1102 is connected to one input port of an adder 1104, a subtracting input port of which is connected to the output of a window guard time register 1106. The output of the adder 1104 forms the output of the transaction window counter 918 and is provided to the comparator 922.

In operation, at the beginning of each frame, the controller 902 asserts the reload signal and causes the down counter 1102 to load in a count which is equal to the duration of the full transaction window available or transaction execution on the USB 104 during the current frame. The value is in units equal to the period of the bit clock, and includes the start-of frame token time but excludes the end of frame region. As time progresses within the frame, the counter 1102 counts down, thereby providing on its output an accurate indication of the amount of time remaining, in units equal to the period of the bit clock. It will be appreciated, however, that because of the pipelined nature of the operation of the host controller hardware 150, the determination of whether enough time remains in the transaction window of the current frame is often made before the preceding transaction is completed on the USB 104. The transaction window counter 918 therefore artificially reduces the remaining duration indication that it provides to comparator 922, by subtracting a predetermined window guard time from register 106. The window guard time in one embodiment is a hardwired value, whereas in another embodiment it is stored in a register that is loaded by the CPU 106. In yet another embodiment, it is a register that is loaded automatically by the dynamic scheduler 806 with the worst-case transaction duration as previously calculated for the transaction then taking place on the USB 104. Note that if the window guard time is to be a fixed value, then the window guard time register 1106 and the adder 1104 could both be omitted simply by reducing the value applied to the load count port of the down counter 1102 by the amount of the desired guard time.

Before describing the transaction duration calculator 920, it will be useful to review how the worst-case transaction was computed in the prior art. In prior art, the worst-case duration for a given transaction was calculated according to the formula:

$$T_{fixed} + T_{byte} * (N_{bytes}),$$

where $T_{byte}$ was the incremental time delay introduced by each byte in the data payload, $N_{bytes}$ was the byte count indicated for the payload of the current transaction, and $T_{fixed}$ was a fixed delay introduced by the system and other transmission-related overhead. $T_{fixed}$ had a different value depending on the transmission duration type (direction, speed and whether handshake was required), but importantly, it always assumed as a worst-case that all transmissions needed to propagate round trip to the maximum hub depth supported by the USB protocol (root hub plus 5 additional hubs).

In a first aspect of the present invention, the worst-case duration for a given transaction is calculated according to a similar formula, except that the maximum hub depth of the actual system topology (for example as determined upon enumeration) is used instead of the maximum hub depth supported by the USB protocol. Thus the formula is:

$$T_{fixed} + T_{hub} * (N_{hubs}) + T_{byte} * (N_{bytes}),$$

where $N_{hubs}$ is the largest hub depth of any device actually on the USB. The value $T_{fixed}$ still has a different value depending on the transmission duration type. In an implementation, the USB system determines $N_{hubs}$ during enumeration, for example by examining the in-memory topology table maintained by the USB system. It then calculates $T_{hub} * (N_{hubs})$ and adds the result to each of the $T_{fixed}$ values for the four transmission duration types. The four resulting values are then stored in the respective transaction duration constant registers as $C_1$, $C_2$, $C_3$ and $C_4$ (see Table III). The ultimate worst-case transaction duration estimate is calculated at the time that a particular transaction is being considered for execution on the USB (e.g. in steps 612, 706 and 714), when the number of bytes in the data payload is known.

In a second aspect of the present invention, the worst-case duration for a given transaction is calculated according to a formula that is again similar to that set forth above for the first aspect of the invention, except that instead of determining $N_{hubs}$ as the greatest hub depth of any device actually on the USB, $N_{hubs}$ is determined as the number of hubs actually in the path to the target device of the transaction. The value $T_{fixed}$ still has a different value depending on the transmission duration type, but it no longer includes any component that depends on any hub depth value. It is determined in advance (for example on initialization) for each of the four transmission duration types and stored by the USB system into the respective transaction duration constant registers as $C_1$, $C_2$, $C_3$ and $C_4$ (see Table III). Like the component of the worst-case delay estimate that depends on the number of bytes in the data payload, the component that depends on hub depth is added in only at the time that a particular transaction is being considered for execution on the USB.

In one embodiment of this second aspect of the invention, the endpoint descriptors in the data structures 304, 306 and 308 each include a field indicating the hub depth $N_{hubs}$ for the device whose endpoint is represented by the endpoint descriptor. Alternatively, the field indicates the entire hub-depth-dependent component $T_{hub}*(N_{hubs})$ of the worst-case transaction duration estimate. The USB system fills these fields whenever it updates the endpoint descriptor list, which includes initialization and whenever the topology of the bus 104 changes in a manner affecting the endpoints in the list. The control registers 802 in the host controller hardware 150 include hub depth registers (or a hub-depth-dependent delay value register) (see Table IV above), and for each new interrupt, control and bulk endpoint descriptor whose transactions are being considered for execution on USB 104, the host controller hardware reads the hub depth (or hub-depth-dependent delay value) by PCI transfer from the endpoint descriptor in main memory 108 and writes it into the hub depth register. The dynamic scheduler 806 uses this value in its estimation of the worst-case transaction duration for the transactions targeting that endpoint.

In another embodiment of this second aspect of the invention, the USB system maintains in main memory 108 a table which correlates each device number on the USB 104 with an indication of its respective hub depth $N_{hubs}$. Alternatively, the table indicates the entire hub-depth-dependent component $T_{hub}*(N_{hubs})$ of the worst-case transaction duration estimate. The USB system updates this table upon initialization and whenever the topology of the bus 104 changes. For example, conventional implementations of a USB system maintain in main memory a topology map which correlates each USB device (including hubs) with the USB hub and hub port number to which it is attached. Such a map is used so that the USB system knows which devices to consider removed from the bus when a user disconnects an entire hub. The information correlating device numbers with their respective hub depths (or with the hub-depth-dependent component of the worst-case transaction delay estimate) can be included as part of such a topology map.

In this embodiment, when the serial interface engine 804 moves to the next endpoint descriptor, in steps 602, 718 or 720 for interrupt, control and bulk transactions respectively, after it reads the target address for the new endpoint from the new endpoint descriptor, it again masters the PCI bus 116 to read the information correlating device numbers with their respective hub depths (or with the hub-depth-dependent component of the worst-case transaction delay estimate). Optionally, the host controller hardware 150 includes a small cache for maintaining several recently used device-address-to-hub-depth correlations. The serial interface engine 804 then writes the hub depth (or hub depth dependent delay value) for the new endpoint into the hub depth register for subsequent use by the transaction duration calculator 920.

FIG. 12 is a block diagram of the transaction duration calculator 920 (FIG. 9). As illustrated, the four fixed delay component registers $C_1$, $C_2$, $C_3$ and $C_4$, from control registers 802 (FIG. 8), have output ports each connected to respective input ports of a four-input multiplexer 1202. The select input of multiplexer 1202 receives a transmission duration type signal, generated by circuitry (not shown) in dependence upon the information in the transaction register for the current transaction. The output port of multiplexer 1202, designated $D_{fixed}$, is provided to an input port of an adder 1204. A second input port of adder 1204, designated $D_{data}$, is connected to the output of a two-input multiplexer 1206, the select input of which is connected to receive the transfer speed indication from the transaction registers of the current transaction. The "normal speed" input port of multiplexer 1206 is connected to receive the output of a multiplier 1208. The output of multiplier 1208 is also connected to the "low speed" input port of multiplexer 1206, but shifted left by three bits (i.e., multiplied by eight). One input of multiplier 1208 receives a fixed value $T_{byte}$, representing the incremental time delay, in units of the bit clock, introduced by each byte in the data payload of a transaction. The other input port of multiplier 1208 receives the data byte count $N_{bytes}$, from the current transaction register.

In the operation of the first aspect of the invention, during enumeration, the USB system determines $N_{hubs}$ as the largest hub depth of any device actually on the USB 104. It then calculates $T_{hub}*N_{hubs}$ and adds the result to each of the $T_{fixed}$ values for the four transmission duration types and writes the results into registers $C_1$, $C_2$, $C_3$ and $C_4$, respectively. Thus after the multiplexer 1202-selects one of the constants $C_1$, $C_2$, $C_3$ or $C_4$ in dependence upon the transmission duration type of a current transaction, the value $D_{fixed}$ includes all components of the worst-case transaction duration estimate except for the component which depends on $N_{bytes}$. That component is provided by the multiplier 1208 and multiplexer 1206 as $D_{data}$, and added to $D_{fixed}$ in adder 1204, to produce the resulting estimate of the worst-case transaction duration for the current transaction.

The same hardware that is used for transaction duration calculator 920 to implement the first aspect of the invention, can also be used to implement the second aspect of the invention. To implement the second aspect of the invention, the hub-depth-dependent delay value $D_{hub\_depth}$ is provided to a third input port of adder 1204. This value can come directly from a register or, as indicated in FIG. 13, can come from the output of a multiplier 1302. The multiplier 1302 multiplies a fixed value $T_{2hub}$, representing the worst-case round trip propagation delay introduced for each hub in the data path to the target device, by the number of hubs $N_{hubs}$ separating the host from the target device on the USB 104. $N_{hubs}$ can come directly from a register.

In either case, the value provided to the third input port of adder 1204, designated $D_{hub\_depth}$, represents the component of the worst-case transaction delay estimate that depends on hub depth. Therefore, the values in the registers $C_1$, $C_2$ $C_3$ and $C_4$ exclude that component of the delay estimate. They include only those components of the delay which do not depend on the topology of the USB 104, and therefore can be loaded by the USB system once upon initialization and then left unchanged during each enumeration.

It is noted that one of the transmission duration types, specifically transmission duration type III (full-speed transactions with an outbound data payload and no handshake required), does not require the host to wait for any propagation delay through the hubs on the USB 104, before beginning the next transaction. In the first aspect of the invention, the USB system takes advantage of this feature by omitting the hub-depth-dependent delay component when calculating $C_3$ resulting in a substantially smaller worst-case transaction delay estimate for transactions of that transmission duration type. In the second aspect of the invention, the system takes advantage of this feature by writing "0" into the hub depth register (or the hub-depth-dependent delay value register) for transactions having this transmission duration type. Alternatively, it can write the usual value into the hub depth register (or the hub-depth-dependent delay value register), but provide a multiplexer to select "0" to the third input port of adder 1204 for transactions having this third transmission duration type.

Numerous variations are possible for implementing the transaction duration calculator 920. For example, instead of using an exact value for $T_{byte}$, an implementation could use a slightly larger value chosen to greatly simplify the multiplier 208. As another example, it is noted that the value $T_{byte}$, the time required for each data byte of the payload, is provided to the down counter 1102 in units equal to the bit clock. In one embodiment, the bit clock has a period of 1 nanosecond, such that $T_{byte}$ is provided in nanoseconds. However, in another embodiment, the down counter 1102 is clocked at a different rate, resulting in a different numerical value for $T_{byte}$. Thus it is possible to greatly simplify the multiplier 1208 simply by choosing the clocking frequency of down counter 1102 such that the numerical value of $T_{byte}$ is a power of 2, or is another value which greatly simplifies the multiplier 1208. Many other variations will be apparent.

It will be appreciated from the above that transactions will be executed in different frames on the USB 104 depending in part on their data byte count and, for implementations of the second aspect of the invention, in part on the hub depth of the target device. FIGS. 14, 15 and 16 illustrate three possible permutations of how two transactions, designated X.A and X.B, could be executed in a frame N and/or in a frame N+1. In FIG. 14, frame N begins with a start-of-frame token 1402. After a period in which other transactions are executed on the bus, the dynamic scheduler 806 determines, by one of the techniques described herein, that sufficient time remains in the transaction window of frame N to execute transaction X.A. It therefore releases transaction X.A for execution in frame N. While transaction X.A is being executed on the USB 104 during time period 1404, the dynamic scheduler 806 determines, by one of the techniques described herein, that sufficient time will still remain in the transaction window of frame N, after completion of transaction X.A, to execute transaction X.B. It therefore releases transaction X.B for execution in frame N, and the execution takes place in time period 1406 in frame N. Other transactions may then take place, and the frame concludes with an EOF period 1408.

In FIG. 15, frame N begins with a start-of-frame token in time period 1502. A number of transactions then take place, after which transaction X.A is considered for execution. The dynamic scheduler 806 determines, by one of the techniques described herein, that insufficient time remains in the transaction window of frame N to execute transaction X.A, so it then proceeds to consider transaction X.B. Again the dynamic scheduler 806 determines, by one of the techniques described herein, that insufficient time remains in the transaction window of frame N to execute transaction X.B. Dynamic scheduler 806 continues considering other transactions, but none is sure to fit in the remaining duration of the transaction window of frame N. The bus 104 is therefore unused during a time period 1504 in frame N, which ends with the EOF 1506. The host 102 issues a new start-of-frame token in a time period 1508 at the beginning of frame N+1, and the dynamic scheduler determines that sufficient time remains in the transaction window of frame N+1 to execute both of the transactions X.A and X.B; and both are executed in time periods 1510 and 1512, respectively in frame N+1.

In FIG. 16, frame N begins with a start-of-frame region 1502. After a number of transactions take place, the dynamic scheduler 806 considers transaction X.A and determines, by one of the techniques described herein, that insufficient time remains in the transaction window of frame N to execute transaction X.A. It then goes on to consider transaction X.B, and determines, by one of the techniques described herein, that sufficient time does remain in the transaction window of frame N to execute transaction X.B. It does so in time period 1604. No other transaction currently pending is sure to fit in the time remaining in the transaction window of frame N after execution of transaction X.B, so the bus remains idle during time period 1606. The end of frame region 1608 then appears, and the host issues the start-of-frame token in time period 1610 at the beginning of frame N+1. The dynamic scheduler determines that sufficient time remains in the transaction window of frame N+1 to execute transaction X.A, and it does so in time period 1612. Several transactions are executed thereafter, and the end of frame region occurs in time frame 1614.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

I claim:

1. A method for controlling a bus, said bus coupling a host to each device in a plurality of devices, each i'th device in said plurality being separated on said bus from said host by a corresponding number $h_i$ of serially connected hubs, $0<=h_i$ for all i'th ones of said devices, at least two of said $h_i$ being unequal, said bus operating according to a protocol in which transactions are executed on said bus in temporally sequential frames each having a predefined transaction window available for executing transactions via said bus, comprising the steps of, for a first transaction destined for a first one of said devices in said plurality:

determining the number $h_i$ of serially connected hubs separating said host from said first device on said bus;

calculating a first worst-case transaction duration for said first transaction; and executing said first transaction on said bus during a current frame only if said first worst-case transaction duration is no greater than a first duration remaining in the transaction window of said current frame, wherein said step of calculating a first worst-case transaction duration includes a step of calculating said first worst-case transaction duration in dependence upon $h_1$.

2. A method according to claim 1, wherein said step of determining $h_1$ comprises the steps of:

predetermining the $h_i$ for all of said devices in said plurality, including predetermining $h_1$ for said first device;

pre-storing, in correspondence with an identification of each given one of said devices, a respective delay value $D_i$ which is a function of the $h_i$ predetermined for said given device, including pre-storing $D_1$ as a function of $h_1$ in correspondence with said first device, and wherein said step of calculating a first worst-case transaction duration for said first transaction includes a step of calculating said first worst-case transaction duration in dependence upon the delay value $D_1$ pre-stored in correspondence with the identification of said first device.

3. A method according to claim 2, comprising the step of performing said steps of predetermining and pre-storing in response to each removal of a device from said bus and in response to each addition of a device to said bus.

4. A method according to claim 1, wherein said protocol supports transactions in a plurality of transmission duration types, each transaction having one of said transmission duration types associated therewith, wherein said step of calculating a first worst-case transaction duration includes a step of calculating said first worst-case transaction duration in dependence upon $h_1$ and further in dependence upon the transmission duration type of said first transaction.

5. A method according to claim 4, wherein said step of calculating said first worst-case transaction duration in dependence upon $h_1$ and further in dependence upon the transmission duration type of said first transaction, comprises the steps of:

providing a delay constant ($C_1$, $C_2$, $C_3$, $C_4$) for each of said transmission duration types; and selecting among said delay constants in dependence upon the transmission duration type of said first transaction.

6. A method according to claim 1, wherein said protocol supports a plurality of types of transactions including first and second types of transactions, said first transaction being of said first type, further comprising a step of executing a second transaction being of said second type without calculating a worst-case transaction duration for said second transaction.

7. A method according to claim 6, wherein said second transaction is executed before said first transaction is executed.

8. A method according to claim 1, wherein said first worst-case transaction duration is no greater than said first duration remaining in the transaction window of said current frame, including the step of executing said first transaction on said bus during said current frame.

9. A method according to claim 1, wherein said first worst-case transaction duration is greater than said first duration remaining in the transaction window of said current frame, further comprising the step of executing said first transaction of said bus during a frame that is subsequent to said current frame.

10. A method according to claim 1, further comprising the steps of, for a second transaction destined for a second one of said devices in said plurality:

determining the number $h_2$ of serially connected hubs separating said host from said second device on said bus;

calculating a second worst-case transaction duration for said second transaction in dependence upon $h_2$; and executing said second transaction on said bus during said current frame only if said second worst-case transaction duration is no greater than a second duration remaining in the transaction window of said current frame.

11. A method according to claim 10, wherein said first transaction is not executed in said current frame and wherein said second duration remaining in the transaction window of said current frame is equal to said first duration remaining in the transaction window of said current frame.

12. A method according to claim 11, wherein said second worst-case transaction duration is no greater than said second duration remaining in the transaction window of said current frame, including the step of executing said second transaction on said bus during said current frame.

13. A method according to claim 12, further comprising the step of executing said first transaction on said bus during a frame that is subsequent to said current frame.

14. A method according to claim 10, wherein neither said first transaction nor said second transaction are executed in said current frame, further comprising the step of executing at least one of said first and second transactions during a frame that is subsequent to said current frame.

15. A method according to claim 10, wherein said first transaction is executed in said current frame and wherein said second duration remaining in the transaction window of said current frame is shorter than said first duration remaining in the transaction window of said current frame.

16. A method according to claim 15, wherein said second transaction is executed in said current frame.

17. A method according to claim 15, wherein said second transaction is not executed in said current frame, further comprising the step of executing said second transaction in a frame subsequent to said current frame.

18. A method according to claim 1, wherein each of said devices defines a respective set of at least one endpoint, and wherein said first transaction further designates a particular endpoint of said first device.

19. A method according to claim 1, wherein said bus is a Universal Serial Bus.

20. A method according to claim 1, wherein said step of executing said first transaction comprises a step of executing said first transaction only if said first worst-case transaction duration is no greater than said first duration remaining in the transaction window of said current frame less a predetermined guard band duration.

21. A method according to claim 1, wherein said step of calculating a first worst-case transaction duration in dependence upon $h_1$, comprises the step of determining a sum of three delays $D_{data}$, $D_{bytes}$ and $D_{hub\_depth}$, where $D_{data}$ is a delay component which depends on a number $N_{bytes}$ of bytes to be transmitted for said first transaction;

$D_{hub\_depth}$ is a delay component which depends on $h_1$; and $D_{fixed}$ is a delay component which depends on neither $N_{bytes}$ nor $h_1$.

22. A method according to claim 21, wherein $D_{hub\_depth}$ is given by $T_{2hub}*h_1$, where $T_{2hub}$ is a predetermined worst-case time delay introduced for round-trip transmission through each of the serially connected hubs separating said host from said first device on said bus.

23. A method according to claim 22, wherein $D_{data}$ is given by $T_{byte}*N_{bytes}$, where $T_{byte}$ is a predetermined worst-case delay introduced for transmission of each byte via said bus.

24. A method according to claim 22, wherein said protocol supports transactions in a plurality of transmission duration types, each transaction having one of said transmission duration types associated therewith, wherein $D_{fixed}$ depends upon the transmission duration type of said first transaction.

25. A method for controlling a bus, said bus having a topology in which a host is coupled to each device in a set of at least one device, each i'th device in said set being separated on said bus from said host by a corresponding number of serially connected hubs, $h_{high}$ being a greatest hub depth over all of said devices in said set, said bus operating according to a protocol in which transactions are executed on said bus in temporally sequential frames each having a predefined transaction window available for executing transactions via said bus, said protocol supporting a predetermined maximum hub depth of $H_{max}$, comprising the steps of, for a first transaction destined for a first one of said devices in said set:

predetermining $h_{high}$ in dependence upon the topology of said bus as it then exists;

calculating a first worst-case transaction duration for said first transaction;

executing said first transaction on said bus during a current frame only if said first worst-case transaction duration is no greater than a first duration remaining in the transaction window of said current frame, wherein said step of calculating a first worst-case transaction duration includes a step of calculating said first worst-case transaction duration in dependence upon $h_{high}$.

26. A method according to claim 25, further comprising a step of pre-storing in a hub-depth-dependent delay register a delay value that depends upon $h_{high}$, and wherein said step of calculating a first worst-case transaction duration includes a step of calculating said first worst-case transaction duration in dependence upon the value pre-stored in said hub-depth-dependent delay register.

27. A method according to claim 25, wherein said protocol supports transactions in a plurality of transmission duration types, each transaction having one of said transmission duration types associated therewith, further comprising a step of pre-storing in respective hub-depth-dependent delay registers a delay value that depends upon $h_{high}$ for each respective one of said transmission duration types, wherein said step of calculating a first worst-case transaction duration includes a step of calculating said first worst-case transaction duration in dependence upon the delay value pre-stored in the hub-depth-dependent delay register for the transmission duration type of said first transaction.

28. A method according to claim 25, further comprising the step of, for a second transaction destined for a second one of said devices in said set:

calculating a second worst-case transaction duration for said second transaction;

executing said second transaction on said bus during a current frame only if said second worst-case transaction duration is no greater than a second duration remaining in the transaction window of said current frame, wherein said step of calculating a second worst-case transaction duration includes a step of calculating said second worst-case transaction duration in dependence upon $h_{high}$.

29. A method according to claim 28, wherein said first transaction is executed in said current frame.

30. A method according to claim 29, wherein said second transaction is executed in said current frame.

31. A method according to claim 29, wherein said second transaction is executed in a frame subsequent to said current frame.

32. A method according to claim 28, wherein said first transaction is executed in a frame subsequent to said current frame and said second transaction is executed in said current frame.

33. A method according to claim 28, wherein said second transaction is executed in said current frame and said first transaction is never executed.

34. A method according to claim 25, wherein each of said devices defines a respective set of at least one endpoint, and wherein said first transaction further designates a particular endpoint of said first device.

35. A method according to claim 25, wherein said bus is a Universal Serial Bus.

36. A method according to claim 25, wherein said step of executing said first transaction comprises a step of executing said first transaction only if said first worst-case transaction duration is no greater than said first duration remaining in the transaction window of said current frame less a predetermined guard band duration.

37. A method according to claim 25, wherein said step of calculating a first worst-case transaction duration comprises the step of determining a sum of three delays $D_{fixed}$, $D_{data}$ and $D_{hub\_depth}$, where $D_{data}$ is a delay component which depends on a number $N_{bytes}$ of bytes to be transmitted for said first transaction;

$D_{hub\_depth}$ is a delay component which depends on $h_{high}$; and $D_{fixed}$ is a delay component which depends on neither $N_{bytes}$ nor $h_{high}$.

38. A method according to claim 37, wherein $D_{hub\_depth}$ is given by $T_{2hub}*h_{high}$, where $T_{2hub}$ is a predetermined worst-case time delay introduced for round trip transmission through each of the serially connected hubs separating said host from said first device on said bus.

39. A method according to claim 38, wherein $D_{data}$ is given by $T_{byte}*N_{bytes}$, where $T_{byte}$ is a predetermined worst-case delay introduced for transmission of each byte via said bus.

40. A method according to claim 38, wherein said protocol supports transactions in a plurality of transmission duration types, each transaction having one of said transmission duration types associated therewith, wherein $D_{fixed}$ depends upon the transmission duration type of said first transaction.

41. A method for controlling a bus, said bus coupling a host to each device in a set of at least one device, each i'th device in said set being separated on said bus from said host by a corresponding number of serially connected hubs, $h_{high}$ being a greatest hub depth over all of said devices in said set, said bus operating according to a protocol in which transactions are executed on said bus in temporally sequential frames each having a predefined transaction window available for executing transactions via said bus, said protocol supporting a predetermined maximum hub depth of $H_{max}$, where $h_{high}<H_{max}$, comprising the steps of, for a first transaction destined for a first one of said devices in said set:

calculating a first worst-case transaction duration for said first transaction;

executing said first transaction on said bus during a current frame only if said first worst-case transaction duration is no greater than a first duration remaining in the transaction window of said current frame, wherein said step of calculating a first worst-case transaction duration includes a step of calculating said first worst-case transaction duration in dependence upon $h_{high}$, $h_{high}$ being less than $H_{max}$.

42. Host controller apparatus for use with a bus and a host, said bus coupling said host to each device in a plurality of devices, each i'th device in said plurality being separated on said bus from said host by a corresponding number $h_i$ of serially connected hubs, $0 <= h_i$ for all i'th ones of said devices, at least two of said $h_i$ being unequal, said bus operating according to a protocol in which transactions are executed on said bus in temporally sequential frames each having a predefined transaction window available for executing transactions via said bus, comprising:

a hub depth value register and a data length value register;

a transaction duration calculator coupled to said hub depth value register and to said data length value register and having a transaction duration output;

a transaction window remaining duration calculator having a transaction window remaining duration output; and scheduling apparatus which, in response to each given one of a subset of transaction descriptors provided to said host controller apparatus, said given transaction descriptor describing a corresponding given transaction which has a corresponding device address and said given transaction descriptor indicating a corresponding transaction data length value, writes into said hub depth value register a value dependent upon a hub depth being the number of serially connected hubs separating said host from the device on said bus which has the device address of said given transaction;

writes into said data length value register a value dependent upon the transaction data length value identified in said given transaction descriptor; and executes said given transaction on said bus during a current frame only if said transaction duration output indicates a worst-case transaction duration which is no greater than a duration remaining in the transaction window of said current frame as indicated by said transaction window remaining duration output.

43. Apparatus according to claim 42, wherein said transaction data length value in said given transaction descriptor indicates a byte count for said given transaction.

44. Apparatus according to claim 43, wherein said value which said scheduling apparatus writes into said data length value register is equal to said transaction data length value in said given transaction descriptor.

45. Apparatus according to claim 42, further comprising a storage unit having stored therein a correspondence between device addresses and their corresponding hub depths, wherein said scheduling apparatus determines said value dependent upon a hub depth, at least in part by look-up in said correspondence of the device address for said given transaction.

46. Apparatus according to claim 45, wherein said scheduling apparatus determines said value dependent upon a hub depth, further by multiplying the corresponding hub depth from said look-up by a predetermined per-hub delay value.

47. Apparatus according to claim 42, further comprising a storage unit having stored therein a correspondence between device addresses and corresponding hub-depth delay values, wherein said scheduling apparatus determines said value dependent upon a hub depth, at least in part by look-up in said correspondence of the device address for said given transaction.

48. Apparatus according to claim 42, wherein said transaction duration calculator comprises circuitry which produces on said transaction duration output a value which is linearly related to a sum of $D_{data}$ and $D_{hub\_depth}$, where $D_{data}$ is a delay value dependent upon the value in said data length value register and $D_{hub\_depth}$ is a delay value dependent upon the value in said hub depth value register.

49. Apparatus according to claim 48, wherein $D_{data}$ is given by $T_{byte}*N_{bytes}$, where $T_{byte}$ is a predetermined worst-case delay value introduced per byte of data and $N_{bytes}$ is the value in said data length value register.

50. Apparatus according to claim 48, wherein $D_{hub\_depth}$ is given by $T_{hub}*N_{hubs}$, where $T_{hub}$ is a predetermined worst-case delay value introduced for round-trip transmission through each hub and $N_{hubs}$ is the value in said hub depth value register.

51. Apparatus according to claim 48, wherein said protocol supports a plurality of transmission duration types, each transaction in said subset having one of said transmission duration types associated therewith, wherein said value produced by said circuitry on said transaction duration output is linearly related to a sum of $D_{data}$, $D_{hub\_depth}$ and $D_{fixed}$, $D_{fixed}$ being a predetermined value dependent upon the transmission duration type of said given transaction.

52. Apparatus according to claim 51, wherein said circuitry further comprises:

a plurality of delay value sources each corresponding to a respective one of said transmission duration types; and a selection mechanism coupled to provide $D_{fixed}$ from one of said delay value sources in dependence upon the transmission duration type of said given transaction.

53. Apparatus according to claim 42 for use further with a facility which provides said subset of transaction descriptors to said host controller apparatus, wherein said scheduling apparatus sequences through said subset of transaction descriptors in a predetermined sequence.

54. Host controller apparatus for use with a bus and a host, said bus coupling said host to each device in a set of at least one device, each i'th device in said set being separated on said bus from said host by a corresponding number of serially connected hubs, said bus operating according to a protocol in which transactions are executed on said bus in temporally sequential frames each having a predefined transaction window available for executing transactions via said bus, comprising:

a fixed delay value register and a data length value register;

a transaction duration calculator coupled to said fixed delay value register and to said data length value register and having a transaction duration output;

a transaction window remaining duration calculator having a transaction window remaining duration output;

topology detection apparatus which determines the largest number $h_{high}$ of serially connected hubs by which any of said devices in said set are separated on said bus from said host, said topology detection apparatus further writing into said fixed delay value register a first delay value which depends upon $h_{high}$; and scheduling apparatus which, in response to each given one of a subset of transaction descriptors provided to said host controller apparatus, said given transaction descriptor describing a corresponding given transaction and including a corresponding transaction data length value, writes into said data length value register a value dependent upon the transaction data length value identified in said given transaction descriptor; and executes said given transaction on said bus during a current frame only if said transaction duration output indicates a worst-case transaction duration which is no greater than a duration remaining in the transaction window of said current frame as indicated by said transaction window remaining duration output.

55. Apparatus according to claim 54, wherein said transaction data length value in said given transaction descriptor indicates a byte count for said given transaction.

56. Apparatus according to claim 55, wherein said value which said scheduling apparatus writes into said data length value register is equal to said transaction data length value in said given transaction descriptor.

57. Apparatus according to claim 54, wherein said transaction duration calculator comprises circuitry which produces on said transaction duration output a value which is linearly related to a sum of $D_{data}$ and $D_{fixed}$, where $D_{data}$ is a delay value dependent upon the value in said data length value register and $D_{fixed}$ is a delay value dependent upon $h_{high}$.

58. Apparatus according to claim 57, wherein $D_{data}$ is given by $T_{byte}*N_{bytes}$, where $T_{byte}$ is a predetermined worst-case delay value introduced per byte of data and $N_{bytes}$ is the value in said data length value register.

59. Apparatus according to claim 57, wherein said protocol supports a plurality of transmission duration types, each transaction in said subset having one of said transmission duration types associated therewith, and wherein said circuitry includes:

a plurality of delay value sources each corresponding to a respective one of said transmission duration types, said plurality of delay value sources including said fixed delay value register; and a selection mechanism coupled to provide $D_{fixed}$ from one of said delay value sources in dependence upon the transmission duration type of said given transaction.

60. Apparatus according to claim 59, wherein each of said delay value sources comprises a respective delay value register, wherein said topology detection apparatus writes into each particular one of said delay value registers a respective delay value which depends upon $h_{high}$ and upon the transmission duration type of the particular delay value register.

61. Apparatus according to claim 54 for use further with a facility which provides said subset of transaction descriptors to said host controller apparatus, wherein said scheduling apparatus sequences through said subset of transaction descriptors in a pre determined sequence.

* * * * *